United States Patent
Maeda et al.

(10) Patent No.: US 11,838,303 B2
(45) Date of Patent: Dec. 5, 2023

(54) LOG GENERATION METHOD, LOG GENERATION DEVICE, AND RECORDING MEDIUM

(71) Applicant: Panasonic Intellectual Property Corporation of America, Torrance, CA (US)

(72) Inventors: Manabu Maeda, Osaka (JP); Jun Anzai, Kanagawa (JP); Takeshi Kishikawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 737 days.

(21) Appl. No.: 16/919,809

(22) Filed: Jul. 2, 2020

(65) Prior Publication Data
US 2020/0336504 A1 Oct. 22, 2020

Related U.S. Application Data

(63) Continuation of application No. PCT/JP2018/044550, filed on Dec. 4, 2018.

(30) Foreign Application Priority Data

Apr. 6, 2018 (JP) .................................. 2018-073654

(51) Int. Cl.
*H04L 9/40* (2022.01)
*G06F 11/30* (2006.01)
(Continued)

(52) U.S. Cl.
CPC ........ *H04L 63/1425* (2013.01); *B60R 16/023* (2013.01); *G06F 11/3013* (2013.01);
(Continued)

(58) Field of Classification Search
CPC .............. H04L 63/1425; H04L 9/3242; H04L 12/40013; H04L 63/1416;
(Continued)

(56) References Cited

U.S. PATENT DOCUMENTS 7,774,361 B1 * 8/2010 Nachenberg ........ H04L 63/1416
707/952
9,749,342 B1 * 8/2017 Krage ................... G06F 21/316
(Continued)

FOREIGN PATENT DOCUMENTS

| JP | 2017-111796 | 6/2017 |
|---|---|---|
| WO | 2009/038028 | 3/2009 |
| WO | 2014/115455 | 7/2014 |

OTHER PUBLICATIONS

Aquize et al., "Self-organizing maps for anomaly detection in fuel consumption. Case study: Illegal fuel storage in Bolivia," 2017 IEEE Latin American Conference on Computational Intelligence (LA-CCI) Year: 2017 | Conference Paper | Publisher: IEEE.*
(Continued)

*Primary Examiner* — Roderick Tolentino
(74) *Attorney, Agent, or Firm* — Wenderoth, Lind & Ponack, L.L.P.

(57) ABSTRACT

A log generation method for generating a log of communication on an in-vehicle network includes: performing a plurality of determination processes for determining, by using different methods, whether or not a message sent to the in-vehicle network is anomalous; generating a log in accordance with results of the plurality of determination processes; and transmitting the generated log. In the generating, information items to be included in the log are determined in accordance with a combination of the results of the plurality of determination processes so that the log does not include identical information items.

7 Claims, 18 Drawing Sheets

(51) Int. Cl.
    *G06F 11/34*     (2006.01)
    *H04L 9/32*     (2006.01)
    *H04W 4/48*     (2018.01)
    *B60R 16/023*     (2006.01)
    *H04L 12/40*     (2006.01)

(52) U.S. Cl.
    CPC ........ *G06F 11/3476* (2013.01); *H04L 9/3242* (2013.01); *H04W 4/48* (2018.02); *H04L 12/40013* (2013.01)

(58) Field of Classification Search
    CPC ......... H04L 2012/40273; H04L 63/14; H04W 4/48; H04W 12/12; B60R 16/023; G06F 11/3013; G06F 11/3476; G06F 11/30; G06F 21/554
    See application file for complete search history.

(56) References Cited

U.S. PATENT DOCUMENTS

| | | |
|---|---|---|
| 2015/0358351 A1 | 12/2015 | Otsuka et al. |
| 2016/0149941 A1* | 5/2016 | Thakur ............... G06F 16/2465 726/23 |
| 2016/0350985 A1 | 12/2016 | McQuade et al. |
| 2017/0013005 A1* | 1/2017 | Galula ................ H04L 63/1425 |
| 2017/0093866 A1* | 3/2017 | Ben-Noon .......... H04L 63/1425 |
| 2017/0126718 A1* | 5/2017 | Baradaran ........... H04L 63/0281 |
| 2017/0279827 A1* | 9/2017 | Savalle .................... H04L 67/02 |
| 2017/0289185 A1* | 10/2017 | Mandyam ............... H04L 63/12 |
| 2018/0191763 A1* | 7/2018 | Hillard ................ H04L 63/1416 |
| 2018/0295147 A1 | 10/2018 | Haga et al. |
| 2019/0042736 A1* | 2/2019 | Krebs ................. H04L 63/1491 |

OTHER PUBLICATIONS

Wang et al., "A Distributed Anomaly Detection System for In-Vehicle Network Using HTM," IEEE Access Year: 2018 | vol. 6 | Journal Article | Publisher: IEEE.*

Extended European Search Report dated Mar. 17, 2021 in corresponding European Patent Application No. 18913659.1.

International Search Report (ISR) dated Feb. 26, 2019 in International (PCT) Application No. PCT/JP2018/044550.

International Preliminary Report on Patentability (IPRP) dated Jul. 16, 2019 in International (PCT) Application No. PCT/JP2018/044550.

* cited by examiner

FIG. 4
| RECEIVED-ID LIST |
|---|
| 1 |
| 2 |
| 3 |
| 4 |
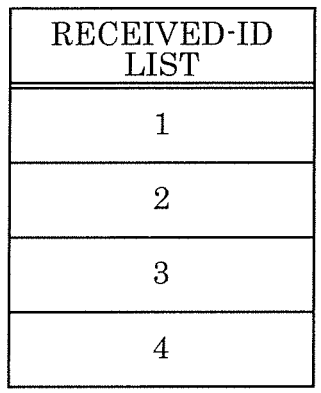
FIG. 5
| TRANSFER SOURCE | TRANSFER DESTINATION | ID |
|---|---|---|
| BUS 200a | BUS 200b | * |
| BUS 200b | BUS 200a | 3 |
FIG. 6
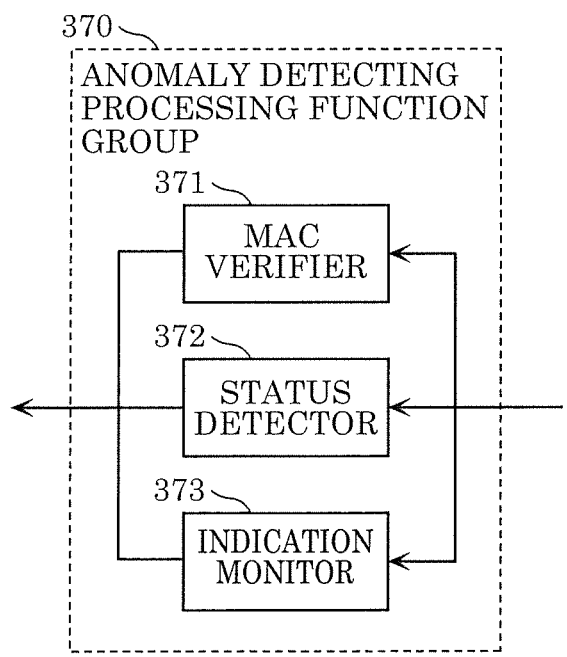

FIG. 7
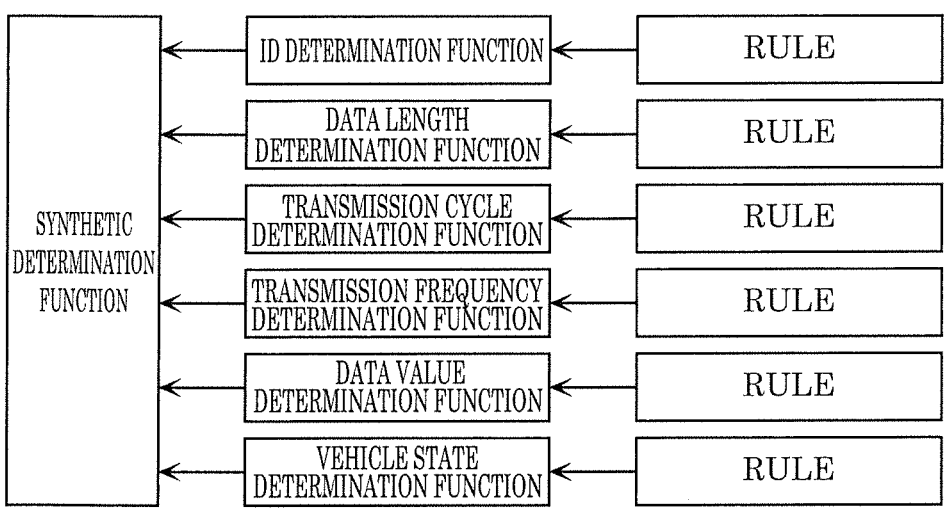
FIG. 8
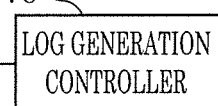

FIG. 9

| | MAC VERIFICATION | STATUS DETECTING | INDICATION MONITORING | LOG OUTPUT |
|---|---|---|---|---|
| 1 | OK | OK | OK | NO LOG IS OUTPUT |
| 2 | OK | OK | NG | INDICATION LOG |
| 3 | OK | NG | OK | STATUS LOG |
| 4 | OK | NG | NG | SAME DETERMINATION REASON: STATUS LOG + INDICATION LOG IDENTIFIER / DIFFERENT DETERMINATION REASONS: STATUS LOG + INDICATION LOG |
| 5 | NG | OK | OK | TOTAL FIELD LOG |
| 6 | NG | OK | NG | TOTAL FIELD LOG + INDICATION LOG IDENTIFIER |
| 7 | NG | NG | OK | TOTAL FIELD LOG + STATUS LOG |
| 8 | NG | NG | NG | TOTAL FIELD LOG + STATUS LOG + INDICATION LOG IDENTIFIER |

FIG. 10

| DETERMINATION FUNCTION THAT DETERMINES AS NG | VALUE DETERMINED AS NG |
|---|---|
| ID DETERMINATION FUNCTION | — |
| DATA LENGTH DETERMINATION FUNCTION | DATA LENGTH |
| TRANSMISSION CYCLE DETERMINATION FUNCTION | RECEPTION TIME DIFFERENCE |
| TRANSMISSION FREQUENCY DETERMINATION FUNCTION | FREQUENCY |
| DATA VALUE DETERMINATION FUNCTION | DATA IDENTIFIER + TARGET DATA VALUE |
| VEHICLE STATE DETERMINATION FUNCTION | VEHICLE STATE IDENTIFIER + CAUSE INFORMATION |

LOG GENERATION METHOD, LOG GENERATION DEVICE, AND RECORDING MEDIUM

CROSS REFERENCE TO RELATED APPLICATIONS

This application is a U.S. continuation application of PCT International Patent Application Number PCT/JP2018/044550 filed on Dec. 4, 2018, claiming the benefit of priority of Japanese Patent Application Number 2018-073654 filed on Apr. 6, 2018, the entire contents of which are hereby incorporated by reference.

BACKGROUND

1. Technical Field

The present disclosure relates to a log generation method for generating a log of communication on an in-vehicle network and the like.

2. Description of the Related Art

In recent years, a large number of devices called electronic control units (hereinafter also referred to as ECUs) are disposed in an in-automobile system. A communication network configured by using such ECUs is called an in-vehicle network. There are a large number of communication standards in communication used in the in-vehicle network. One of the main communication standards in the in-vehicle network is the controller area network (CAN).

In a network that employs the CAN standard (CAN network), the communication path (bus) consists of two cables, and ECUs connected to the buses are also called nodes. Each node connected to the bus transmits and receives data in units called messages or in units of frames to which a message is divided. In CAN, no identifier indicating a data transmission destination or a data transmission source is used.

A node that transmits frames (transmission node) transmits each message added with an ID called a message ID indicating a type of the message, in other words, sends a signal to the bus. A node that receives messages (reception node) receives only messages each including a predetermined message ID, in other words, reads the signal from the bus. Messages having the same ID are transmitted in a fixed cycle.

As described above, a large number of ECUs disposed in an in-automobile system are connected to a CAN network and operate while exchanging messages with each other.

Here, when an ECU having the function of communicating with devices external to the CAN network is, for example, anomalously accessed from an external device, the ECU could be anomalously controlled by a malicious third party and could transmit an anomalous message to the CAN network. The ECU anomalously controlled by a malicious third party (anomalous ECU) can pretend, for example, to be another ECU in the CAN network and transmit an anomalous message to anomalously control the vehicle. International Publication No. WO 2014/115455 (hereinafter, referred to as PTL 1), for example, discloses a method for detecting such an anomalous control or what is called a pretender attack.

SUMMARY

It is, however, difficult for the method disclosed in PTL 1, which can only detect an anomalous message in an ECU, to detect an anomalous message by using an external device, such as a server. Furthermore, the method disclosed in PTL 1 has a problem of incapability of close investigation of an anomalous message after the message is transmitted, not when the message is transmitted.

The present disclosure solves the problems described above, and an object of the present disclosure is to provide a log generation method, a log generation device, and the like that generate and output log information necessary for determining whether or not each of messages sent to a bus is anomalous.

In order to solve the above-described problem, in accordance with an aspect of the present disclosure there is provided a log generation method for generating a log of communication on an in-vehicle network, the log generation method including: performing a plurality of determination processes for determining, by using different methods, whether or not a message sent to the in-vehicle network is anomalous; generating a log in accordance with results of the plurality of determination processes; and transmitting the generated log, wherein the generating includes determining at least one information item to be included in the log in accordance with a combination of the results of the plurality of determination processes, the at least one information item not including identical information items.

General or specific aspects of the present disclosure may be implemented to a system, a device, a method, an integrated circuit, a computer program, a computer-readable recording medium such as a Compact Disc-Read Only Memory (CD-ROM), or any given combination thereof.

Advantageous Effect of Invention

By the log generation method and the like according to the aspect of the present disclosure, information to be included in a log is determined in accordance with whether or not a message sent to a network is anomalous. It is thereby possible to minimize the log to be outputted and eventually reduce a cost.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 4 shows an example of a received ID list in Embodiment 1.

FIG. 5 shows an example of transfer rules in Embodiment 1.

FIG. 6 is a block diagram showing an example of an anomaly detecting processing function group in Embodiment 1.

FIG. 7 is a block diagram showing an example of a status detector in Embodiment 1.

FIG. 8 is a block diagram showing an example of a log generation processing function group in Embodiment 1.

FIG. 9 shows an example of log generation determination performed by a log generation controller in Embodiment 1.

FIG. 10 shows examples of a value included in a log and determined as NG in Embodiment 1.

Figure 1:
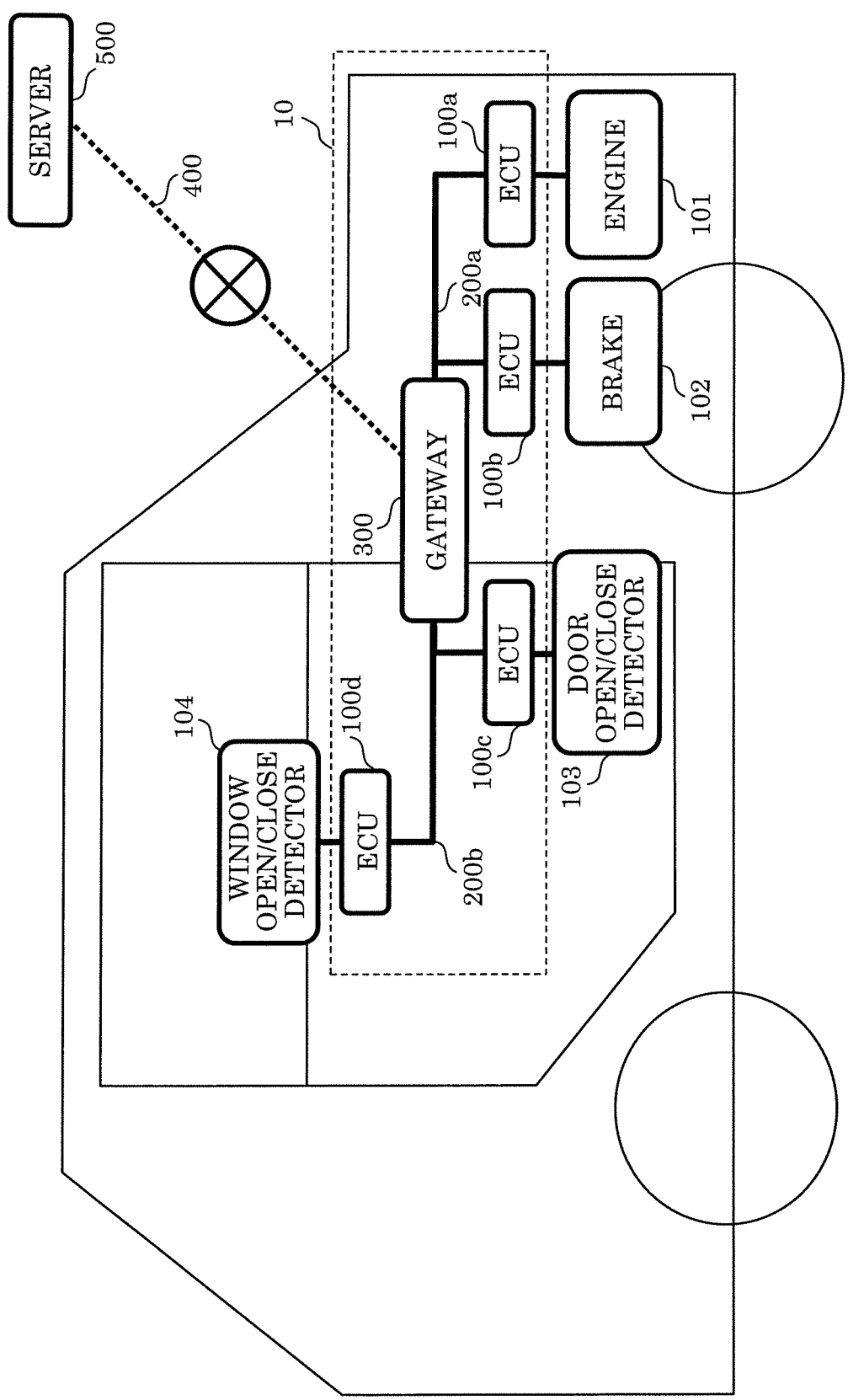
FIG. 1 is a block diagram showing an overall configuration of an in-vehicle network system in Embodiment 1.

DETAILED DESCRIPTION OF THE EMBODIMENTS (Findings Based on which Present Disclosure has been Made)

When the function of determining whether an anomalous message has been transmitted to a CAN network generates and outputs the result of the determination and information on the result of the determination as a log, a large amount of data is required to check afterwards in detail the situation in which the determination result shows anomaly. When a large storage capacity is required at a destination to which the log is outputted or a large amount of communication is required to transmit the data to the output destination, a large amount of cost is incurred.

In accordance with an aspect of the present disclosure, there is provided a log generation method for generating a log of communication on an in-vehicle network, the log generation method including: performing a plurality of determination processes for determining, by using different methods, whether or not a message sent to the in-vehicle network is anomalous; generating a log in accordance with results of the plurality of determination processes; and transmitting the generated log, wherein the generating includes determining at least one information item to be included in the log in accordance with a combination of the results of the plurality of determination processes, the at least one information item not including identical information items.

Thereby, it is possible to determine information to be included in a log, in accordance with results of determining as to whether or not a message sent to a network is anomalous. It is thereby possible to minimize the log to be outputted and eventually reduce a cost.

In the log generation method according to the aspect of the present disclosure, the plurality of determination processes may include as one of the different methods a Message Authentication Code (MAC) verification process of verifying a MAC of the message to determine whether or not the message is anomalous.

The integrity of the received message can thus be checked, whereby anomaly of the message sent to the network can be determined.

In the log generation method according to the aspect of the present disclosure, the plurality of determination processes may include a status detecting process of detecting status of a vehicle in accordance with the message to determine whether or not the message is anomalous.

The configuration described above can detect that an ECU in the vehicle is externally attacked or otherwise controlled and taken over by a malicious third party and the vehicle is therefore in an anomalous state. It is thereby possible to determine whether or not the message sent to the network is anomalous.

In the log generation method according to the aspect of the present disclosure, the plurality of determination processes may include an indication monitoring process of monitoring whether or not the message has an indication of an anomaly to determine whether or not the message is anomalous.

The configuration described above can detect anomaly of the transmission cycle and other factors of the message. It is thereby possible to determine whether or not the message sent to the network is anomalous.

In the log generation method according to the aspect of the present disclosure, it is possible that the plurality of determination processes include: a status detecting process of detecting status of a vehicle in accordance with the message to determine whether or not the message is anomalous; and an indication monitoring process of monitoring whether or not the message has an indication of anomaly to determine whether or not the message is anomalous, and that in the generating, in a case where the status detecting process and the indication monitoring process both determine that the message is anomalous, (A) when a reason for which the status detecting process determines that the message is anomalous is different from a reason for which the indication monitoring process determines that the message is anomalous, the at least one information item is: (i) a value determined in the status detecting process as anomalous; and (ii) a value determined in the indication monitoring process as anomalous, and (B) when the reason for which the status detecting process determines that the message is anomalous is same as the reason for which the indication monitoring process determines that the message is anomalous, the at least one information item is: one of (i) the value determined in the status detecting process as anomalous and (ii) the value determined in the indication monitoring process as anomalous is generated as the log.

Therefore, when the message sent to the network has been determined as anomalous, the amount of data in the log to be outputted can be reduced.

In accordance with another aspect of the present disclosure, there is provided a log generation device that generates a log of communication on an in-vehicle network, the log generation device including: at least one processor; and a memory including at least one set of instructions that, when executed by the processor causes the processor to perform operations including: performing a plurality of determination processes for determining, by using different methods, whether or not a message sent to the in-vehicle network is anomalous; generating a log in accordance with results of the plurality of determination processes; and transmitting the generated log, wherein the generating includes determining at least one information item to be included in the log in accordance with a combination of the results of the plurality of determination processes, the at least one information item not including identical information items.

The log generation device described above can determine information to be included in a log, in accordance with the results of determining whether or not a message sent to the network is anomalous. It is thereby possible to minimize the log to be outputted and eventually reduce a cost.

In accordance with still another aspect of the present disclosure, there is provided a non-transitory computer-readable recording medium embodied with a computer program that causes one or more processors in the above-described log generation device to perform the above-described log generation method.

The program described above can determine information to be included in a log, in accordance with the results of determining whether or not a message sent to the network is anomalous. It is thereby possible to minimize the log to be outputted and eventually reduce a cost.

Hereinafter, certain exemplary embodiments will be described in detail with reference to the accompanying Drawings.

The following embodiments are general and specific examples of the present disclosure. The numerical values, shapes, materials, elements, arrangement and connection configuration of the elements, steps, the order of the steps, etc., described in the following embodiments are merely examples, and are not intended to limit the present disclosure. Among elements in the following embodiments, those not described in any one of the independent claims indicating the broadest concept of the present disclosure are described as optional elements.

Embodiment 1

[1. Overview]

With reference to the Drawings, the present embodiment will describe a case where an in-vehicle network system determines whether or not a message being transmitted is anomalous and generates a log in accordance with the result of the determination.

[1.1 Overall Configuration of In-Vehicle Network System]

FIG. 1 is a block diagram showing an overall configuration of in-vehicle network system 10 according to the present embodiment.

In FIG. 1, in-vehicle network system 10 includes a CAN network and includes ECUs 100a, 100b, 100c, and 100d, buses 200a and 200b, gateway 300, external network 400, and server 500.

In the following description, ECUs 100a, 100b, 100c, and 100d are collectively called ECU 100 in some cases. Furthermore, any of ECUs 100a, 100b, 100c, and 100d is referred to and described as ECU 100 in some cases.

In the following description, buses 200a and 200b are collectively called bus 200 in some cases. Furthermore, one of buses 200a and 200b is referred to and called bus 200 in some cases.

ECU 100a is connected to engine 101, and ECU 100b is connected to brake 102. ECU 100c is connected to door open/close detector 103, and ECU 100d is connected to window open/close detector 104.

ECU 100 acquires the state of the instrument connected thereto and periodically sends a message indicating the acquired state of the instrument to bus 200. For example, ECU 100a acquires the rotational speed of engine 101 and sends a message including a data value indicating the rotational speed with a predetermined ID attached to the message to bus 200.

ECU 100 reads a message transmitted from another ECU 100 via bus 200 and selectively receives the message in accordance with the ID attached to the message. The selective reception will be described later.

Gateway 300 connects bus 200a, to which ECUs 100a and 100b are connected, to bus 200b, to which ECUs 100c and 100d are connected. Gateway 300 has the function of transferring a message received via one bus 200 to other bus 200. Gateway 300 is also a node in the CAN network.

External network 400 is a communication network that allows gateway 300 to communicate with server 500. A method in accordance with which external network 400 performs the communication may be a wired communication method or a wireless communication method. The wireless communication method may be Wi-Fi (registered trademark) or 3G/LTE.

Server 500 communicates with gateway 300 via external network 400.

In-vehicle network system 10 is an example for description of a system to which a log generation system or any other system that determines whether or not a message is anomalous and generates a log to be outputted is applicable. The system to which the log generation system is applied is not limited to in-vehicle network system 10.

[1.2 Data Format of Message]

Figure 2:
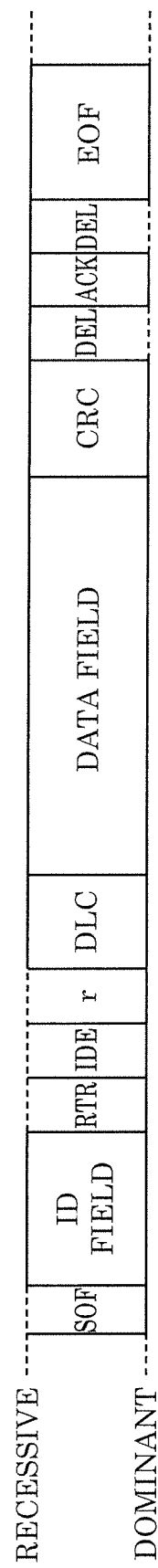
FIG. 2 shows a format of a message (data frame) in compliance with a CAN protocol in Embodiment 1.

FIG. 2 shows a format of a message (data frame) in compliance with the CAN protocol. FIG. 2 shows a message having a standard ID format in the CAN protocol.

A message includes a start of frame (SOF), an ID field, a remote transmission request (RTR), an identifier extension (IDE), a reserve bit (also called r), a data length code (DLC), a data field, a cyclic redundancy check (CRC) sequence, a CRC delimiter (left DEL in FIG. 2), an acknowledgement (ACK) slot, an ACK delimiter (right DEL in FIG. 2), and an end of frame (EOF).

The SOF is a 1-bit dominant. A dominant means dominance. A dominant is the state in which voltage is so applied to two cables that form a bus that a value of "0" is transmitted in a CAN network using a digital scheme for data transmission or the value of "0" to be transmitted. On the other hand, the state in which voltage is so applied to the two cables that form a bus that a value of "1" is transmitted or the value of "1" to be transmitted is called recessive. Recessive means recessiveness. When the values of "0" and "1" are simultaneously transmitted from two nodes to the bus, the value of "0" has priority. The bus that idles has the recessive state. ECU 100 starts transmitting a message by changing the state of bus 200 from the recessive to the dominant, and another ECU 100 reads the change and synchronizes with the state. In FIG. 2, a portion where a line that forms a message and shows the dominant or the recessive is a solid line shows that the portion can have the dominant or recessive value. SOF is fixed to the dominant state, so that the dominant line is a solid line, and the recessive line is a broken line.

The ID is an 11-bit value indicating the type of data included in the message. In CAN, communication arbitration among messages that a plurality of nodes start simultaneously transmitting is so designed that a message having a smaller ID value has higher priority.

The RTR is a 1-bit dominant indicating that a frame is a message (data frame).

The IDE and r are each a 1-bit dominant.

The DLC is a 4-bit value indicating the length of the following data field.

The data field is a value indicating the content of data to be transmitted and has a 64-bit length at the maximum, and the length can be adjusted stepwise by a step of 8 bits. The specifications on allocation of data to be transmitted to the data field depend on the vehicle type, the manufacturer, and other factors of vehicle.

The CRC sequence is a 15-bit value calculated by the transmitted values of the SOF, ID field, control field, and data field.

The CRC delimiter is fixed to 1-bit recessive and is a delimiter indicating the end of the CRC sequence. A reception node determines whether or not anomaly has occurred by comparing the result of calculation using the values of the SOF, ID field, control field, and data field of the received message with the value of the CRC sequence.

The ACK slot has the 1-bit length, and a transmission node transmits a recessive in the ACK slot. A reception node transmits a dominant as an acknowledgment as long as the SOF to the CRC sequence has been normally received. Since a dominant has priority, bus 200 during transmission of the ACK slot has the dominant state as long as the communication of one message has been normally completed up to the point of the CRC sequence.

The ACK delimiter is fixed to 1-bit recessive and is a delimiter indicating the end of the ACK slot.

EOF is fixed to 7-bit recessive and represents the end of the message.

[1.3 Configuration of Gateway]

Figure 3:
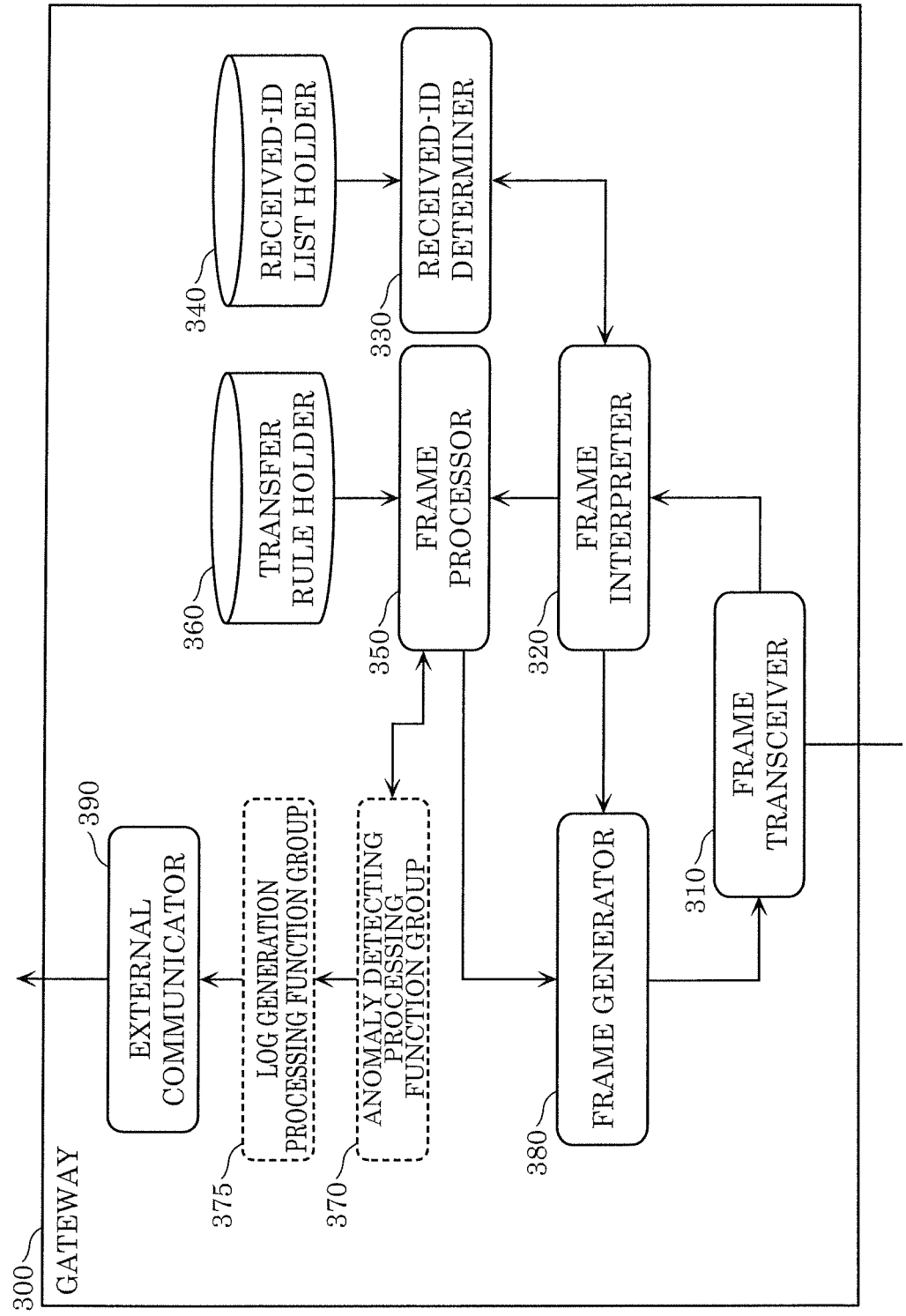
FIG. 3 is a block diagram showing an example of a gateway provided in the in-vehicle network system in Embodiment 1.

FIG. 3 is a block diagram showing an example of the gateway provided in the in-vehicle network system according to the present embodiment. In FIG. 3, gateway 300 includes frame transceiver 310, frame interpreter 320, received-ID determiner 330, received-ID list holder 340, frame processor 350, transfer rule holder 360, anomaly detecting processing function group 370, log generation processing function group 375, frame generator 380, and external communicator 390.

The configuration above is a functional configuration, and gateway 300 is provided as an information processing device including a processing unit achieved, for example, by a processor, a storage achieved, for example, by a semiconductor memory, an input/output unit achieved by input/output ports, and other components.

The functional configuration above may be achieved by causing the processing unit to read and execute a program held in the storage and hold predetermined data in the storage or transmit and receive the data via the input/output unit. The functional configuration above may instead be achieved by a combination thereof.

The log generation method according to an aspect of the present disclosure is not necessarily achieved by a gateway. Frame transceiver 310, frame interpreter 320, received-ID determiner 330, received-ID list holder 340, frame processor 350, transfer rule holder 360, anomaly detecting processing function group 370, log generation processing function group 375, frame generator 380, and external communicator 390 may be achieved by single ECU 100 or a plurality of ECUs 100.

Frame transceiver 310 transmits and receives a message in compliance with the CAN protocol to and from each of buses 200a and 200b.

More specifically, frame transceiver 310 reads a message sent to bus 200 in such a way that the message is read by 1 bit at a time and transfers the read message to frame interpreter 320.

Frame transceiver 310 sends the message to buses 200a and 200b by 1 bit at a time in accordance with bus information transmitted from frame generator 380.

Frame transceiver 310 performs the transfer of the message between buses 200a and 200b by transmitting the message received via bus 200a to bus 200b and transmitting the message received via bus 200b to bus 200a.

Frame interpreter 320 receives the values of the message from frame transceiver 310 and maps the values in the fields in the CAN protocol to interpret the received message. Frame interpreter 320 transfers a series of values interpreted as values of the ID field to received-ID determiner 330.

Frame interpreter 320 further determines whether the values of the ID field of the message and the data field located after the ID field are transferred to frame processor 350 or the reception of the message is terminated in accordance with the determination result notified by received-ID determiner 330.

When the result of the determination shows that the received message is a message that does not comply with the CAN protocol, frame interpreter 320 requires frame generator 380 to transmit an error frame.

The error frame is a frame that is transmitted from the node when an error occurs in the CAN network, differs from the message described above, and has a predetermined format specified by the CAN protocol. When an error frame is sent to the bus, the transmission of the message in the network is terminated.

When the interpretation performed by frame interpreter 320 shows that an error frame transmitted by another node is received, frame interpreter 320 discards the message being read.

Received-ID determiner 330 receives the values of the ID field from frame interpreter 320 and determines in accordance with a list of message IDs held by received-ID list holder 340 whether or not the read message is received. Received-ID determiner 330 notifies frame interpreter 320 of the result of the determination.

Received-ID list holder 340 holds the list of message IDs (hereinafter also referred to as received ID list) received by gateway 300. FIG. 4 shows an example of the received ID list according to the present embodiment. The received ID list in FIG. 4 will be described later in detail.

Frame processor 350 determines bus 200 that is the transfer destination in accordance with the ID of the received message in compliance with data transfer rules held by transfer rule holder 360 and notifies frame generator 380 of bus 200 that is the transfer destination, the message ID notified by frame interpreter 320, and the data to be transferred.

Frame processor 350 sends the message received from frame interpreter 320 to anomaly detecting processing function group 370 and requests anomaly detecting processing function group 370 to determine whether or not the message is anomalous. Frame processor 350 does not transfer a message determined by anomaly detecting processing function group 370 to be an anomalous message.

Transfer rule holder 360 holds data transfer rules in accordance with which data is transferred via bus 200 (hereinafter also referred to as transfer rules). FIG. 5 shows an example of the transfer rules according to the present embodiment. The transfer rules in FIG. 5 will be described later in detail.

Anomaly detecting processing function group 370 is a function group that determines whether or not a message being received is anomalous. The functional configuration included in anomaly detecting processing function group 370 will be described later in detail. Anomaly detecting processing function group 370 notifies frame processor 350 and log generation processing function group 375 of the result of the determination.

When anomaly detecting processing function group 370 determines that the message being received is anomalous, log generation processing function group 375 generates a log in accordance with the result of the determination and outputs the log to server 500 via external communicator 390. The functional configuration included in log generation processing function group 375 will be described later in detail.

Frame generator 380 generates the error frame in accordance with an error frame transmission requirement from frame interpreter 320 and causes frame transceiver 310 to send the error frame.

Frame generator 380 uses the message ID and the data received from frame processor 350 to generate a message frame and sends the message frame along with the bus information to frame transceiver 310.

External communicator 390 communicates with server 500 via external network 400.

[1.4 Received ID List]

FIG. 4 shows an example of the received ID list according to the present embodiment. The received ID list is a list of message IDs of messages received and processed by gateway 300 and is held by received-ID list holder 340.

In FIG. 4, the received ID list stores the ID of a message in each row. In the received ID list shown in FIG. 4, the message IDs are "1", "2", "3", and "4", and gateway 300 receives a message having any of the message IDs. Gateway 300 terminates reception of a message having a message ID that is not included in the received ID list.

The values of the ID and the number of IDs included in the received ID list are presented as an example for the description and do not restrict the configuration of the received ID list used by gateway 300.

[1.5 Transfer Rule]

FIG. 5 shows an example of the transfer rules according to the present embodiment. The transfer rules are held by transfer rule holder 360. In FIG. 5, the transfer rules are each stored in a row in the form of the combination of bus 200 that is the source from which the message is transferred, bus 200 that is the destination to which the message is transferred, and the message ID of the message to be transferred.

More specifically, the transfer rule in the first row includes transfer source "bus 200a," transfer destination "bus 200b," and ID "*", which means that gateway 300 transfers a message received from bus 200a to bus 200b irrespective of the ID. The transfer rule in the second row includes transfer source "bus 200b," transfer destination "bus 200a," and ID "3", which means that gateway 300 transfers a message received from bus 200b to bus 200a when the ID of the message is "3".

[1.6 Configuration of Anomaly Detecting Processing Function Group]

FIG. 6 is a block diagram showing an example of anomaly detecting processing function group 370 with which gateway 300 according to the present embodiment is provided. In FIG. 6, anomaly detecting processing function group 370 includes message authentication code (MAC) verifier 371, status detector 372, and indication monitor 373.

The configuration above is a functional configuration and is achieved in gateway 300 by causing the processing unit to read and execute the program recorded in the storage and record predetermined data in the storage. The configuration above may instead be achieved by transmitting and receiving data via the input/output unit instead of recording predetermined data in the storage. The configuration above may still instead be achieved by the combination thereof.

MAC verifier 371 verifies the MAC of a message received from frame processor 350 and outputs OK or NG. The received message includes a message body and a MAC. MAC verifier 371 calculates a MAC from the message body and a key set in advance, compares the calculated MAC with a MAC included in the message received from frame processor 350, and outputs OK when the comparison shows coincidence of the MACs whereas outputting NG when the comparison shows non-coincidence of the MACs.

The algorithm of the MAC may be any of typically known algorithms and can, for example, be a hash-based message authentication code (HMAC), a one-key message authentication code (OMAC), a cipher-based message authentication code (CMAC), and a cipher block chaining message authentication code (CBC-MAC).

The MAC included in the message received from frame processor 350 may be the value itself calculated by using the MAC algorithm, only part of the calculated value, or a value into which the calculated value is further converted. In this process, information on which part of the calculated value is used and information on how the value is converted are given in advance to MAC verifier 371, and MAC verifier 371 verifies the MAC included in the received message in accordance with the information.

The message received from frame processor 350 includes no MAC in some cases. In such cases, MAC verifier 371 may output OK as the result of the verification or may output a result showing that no MAC is included.

Status detector 372 determines whether or not the message received from frame processor 350 is anomalous.

Status detector 372 has a plurality of detecting functions, and the detecting functions each refer to a rule set in advance and determine whether or not the message received from frame processor 350 is anomalous.

FIG. 7 is a block diagram showing an example of the status detector according to the present embodiment. In FIG. 7, status detector 372 has six determination functions. More specifically, the determination functions include an ID determination function that is the function of checking the ID field of a message, a data length determination function that is the function of checking the data length of the message, a transmission cycle determination function that is the function of checking the cycle in which (time intervals at which) the message is transmitted, a transmission frequency determination function that is the function of checking the frequency of transmission of the message, and a data value determination function that is the function of checking the value of the data field (data value) of the message. The determination functions further include a vehicle state determination function that is the function of recognizing the state of the vehicle in accordance with the results of the determination using the determination functions, such as the transmission cycle, the frequency, the data value, or the amount of change in the data value, and checking the state of the vehicle. Status detector 372 further has a synthetic determination function of synthetically determining whether or not the message received from frame processor 350 is anomalous in accordance with the results of the determination using the determination functions. The result of the synthetic determination function is the result of the detecting process performed by status detector 372.

Referring back to FIG. 6, the description of anomaly detecting processing function group 370 will be resumed.

In FIG. 6, indication monitor 373 determines whether the message received from frame processor 350 shows an indication of anomaly. More specifically, the contents of determination functions are the same as those of status detector 372. Rules different from the rules set in status detector 372 are set in indication monitor 373.

For example, when the cycle in which (time intervals at which) the message is transmitted is shorter than a value set in the rules, indication monitor 373 may determine that there is an indication showing that anomaly has occurred and output the determination result of NG. In this process, the rule held by the transmission cycle determination function of status detector 372 differs from the rule in indication monitor 373, and indication monitor 373 may therefore output the determination result of OK because indication monitor 373 cannot definitely determine that the received message is anomalous.

Status detector 372 outputs the determination result of NG in accordance with the result of determination other than the determination of the cycle in some cases. When the transmission frequency is greater than a value set in the rule, indication monitor 373 may determine that there is an indication showing that anomaly has occurred and output the determination result of NG.

When out of the result of the determination performed by MAC verifier 371, the result of the determination performed by status detector 372, and the result of the determination performed by indication monitor 373, the result of the determination performed by MAC verifier 371 or the result of the determination performed by status detector 372 is NG, anomaly detecting processing function group 370 outputs the determination result of NG to frame processor 350.

Anomaly detecting processing function group 370 notifies log generation processing function group 375 of the result of the determination performed by MAC verifier 371, the result of the determination performed by status detector 372, the result of the determination performed by indication monitor 373, the results of the determination using the determination functions of status detector 372, and the results of the determination using the determination functions of indication monitor 373.

The determination functions of indication monitor 373 are the same as those of status detector 372, but the present disclosure is not limited to the above. For example, the determination functions of indication monitor 373 may be only part of the determination functions of status detector 372. Another determination function may be added to the determination functions of indication monitor 373. The other determination function may perform determination using, for example, values from a variety of detectors attached to the vehicle or data provided from an instrument external to the vehicle.

It has been described above that rules different from those in status detector 372 are set in indication monitor 373, but the present disclosure is not limited to the above. For example, the rules of part of the determination functions of indication monitor 373 may be the same as the rules of the determination functions of status detector 372. In rules in each of which the range of data in a determination target message is set, one rule may include both a range over which status detector 372 makes NG determination and a wider range over which indication monitor 373 makes NG determination.

There is a case where not only anomaly but an indication of anomaly and other situations are collectively called anomaly in some cases. The anomaly detecting processing function group performs a plurality of determination processes for determining whether or not a message is anomaly by using different methods. The determination processes are basically performed independently of one another and simultaneously with one another.

[1.7 Configuration of Log Generation Processing Function Group]

FIG. 8 is a block diagram showing an example of the log generation processing function group according to the present embodiment. In FIG. 8, log generation processing function group 375, with which gateway 300 is provided, includes log generation controller 376 and log-related information holder 377.

The configuration above is a functional configuration and is achieved in gateway 300 by causing the processing unit to read and execute the program held in the storage and record predetermined data in the storage. The configuration above may instead be achieved by transmitting and receiving data via the input/output unit instead of recording predetermined data in the storage. The configuration above may still instead be achieved by the combination thereof.

Log generation controller 376 is notified by anomaly detecting processing function group 370 of information relating to the result of the detecting and the received message, for example, the received message or the message reception time, and determines whether a log is to be outputted.

When log generation controller 376 determines that a log is to be outputted, log generation controller 376 generates a log including the information in accordance with the result of the detecting.

Log generation controller 376 notifies external communicator 390 of the generated log and requests external communicator 390 to transmit the log to the server. In this process, external communicator 390 also transmits a vehicle identifier allocated on a vehicle basis to identify the vehicle.

An Example of the determination performed by log generation controller 376 will be described with reference to FIG. 9. FIG. 9 shows an example of log generation determination performed by the log generation controller according to the present embodiment. In FIG. 9, results of the determination performed by MAC verifier 371 are shown in the "MAC VERIFICATION" column, results of the determination performed by status detector 372 are shown in the "STATUS DETECTING" column, and results of the determination performed by indication monitor 373 are shown in the "INDICATION MONITORING" column.

Log generation controller 376 makes determinations, in accordance with the results of the determination performed by MAC verifier 371, status detector 372, and indication monitor 373, as to whether or not a log is to be outputted, when it is determined that a log is to be outputted, what kind of information is to be generated as a log, etc.

For example, in a case where the result of the determination performed by MAC verifier 371 is OK, the result of the determination performed by status detector 372 is OK, and the result of the determination performed by indication monitor 373 is OK, as shown in the first row in FIG. 9, log generation controller 376 determines that no log is to be outputted, whereas in the other cases, log generation controller 376 determines that a log is to be outputted.

Furthermore, having determined that a log is to be outputted, log generation controller 376 determines the information to be outputted as a log in accordance with the results of the determinations performed by MAC verifier 371, status detector 372, and indication monitor 373.

For example, when the result of the determination performed by MAC verifier 371 is OK, the result of the determination performed by status detector 372 is OK, and the result of the determination performed by indication monitor 373 is NG, as shown in the second row in FIG. 9, log generation controller 376 generates an "indication log" as information to be outputted as a log. The "indication log" includes: (i) a log type identifier indicating that indication monitor 373 makes NG determination; (ii) an indication log identifier indicating the reason for which indication monitor 373 has made the NG determination; a value determined by indication monitor 373 as NG; and also an ID of the received message, as needed.

When the result of the determination performed by MAC verifier 371 is OK, the result of the determination performed by status detector 372 is NG, and the result of the determination performed by indication monitor 373 is OK, as shown in the third row in FIG. 9, log generation controller 376 generates a "status log" as information to be outputted as a log. The "status log" includes: a log type identifier indicating that status detector 372 has made the NG determination; a status log identifier indicating the reason for which status detector 372 has made the NG determination; a value determined by status detector 372 as NG; a value of a previously received message that corresponds to the value determined by status detector 372 as NG; and also an ID of the message, as needed.

The value of a previously received message that corresponds to the value determined by status detector 372 as NG may be (i) a value of a previously received message having the same ID as the currently received message or (ii) a plurality of values of messages retroactively counted from the currently received message by a predetermined period or a predetermined number of messages. Log generation controller 376 acquires information relating to the previously received messages from log-related information holder 377 and generates the status log.

When the result of the determination performed by MAC verifier 371 is OK, the result of the determination performed by status detector 372 is NG, and the result of the determination performed by indication monitor 373 is NG, as shown in the fourth row in FIG. 9, a log to be generated varies depending on whether the reason for which status detector 372 has made the NG determination is the same as or different from the reason for which indication monitor 373 has made the NG determination.

For example, when the reason for which status detector 372 has made the NG determination is the same as the reason for which indication monitor 373 has made the NG determination, log generation controller 376 generates log information that includes: a status log; a log type identifier indicating that indication monitor 373 has made the NG determination; and an indication log identifier.

When the reason for which status detector 372 has determined the received message as NG is different from the reason for which indication monitor 373 has determined the received message as NG, log generation controller 376 generates log information that includes: a status log; and an indication log.

That is, in the case where the determination reasons are the same, only one of (i) the value determined by status detector 372 as NG and (ii) the value determined by indication monitor 373 as NG is generated as a log to be outputted. In the above description, only the value determined by status detector 372 as NG is outputted. However, it is also possible to output only the value determined by indication monitor 373 as NG. When the determination reasons for which the received message has been determined as NG are different from each other, both the values are outputted.

When the result of the determination performed by MAC verifier 371 is NG, the result of the determination performed by status detector 372 is OK, and the result of the determination performed by indication monitor 373 is OK, as shown in the fifth row in FIG. 9, log generation controller 376 generates a "total field log." The "total field log" includes: a log type identifier indicating that MAC verifier 371 has made the NG determination; and the entire received message.

When, as shown in the sixth, seventh, and eighth rows in FIG. 9, the result of the determination performed by MAC verifier 371 is NG and the results of the determinations performed by status detector 372 and indication monitor 373 are those other than the result in the fifth row in FIG. 9, log generation controller 376 generates log information includes: any of the combinations of the logs and the identifiers described above.

As described above, in accordance with the combination of the results of the plurality of determination processes performed on the received message, information items in the log are determined not to include identical information items in the same log.

Out of the logs in the seventh and eighth rows in FIG. 9, the status log includes: the log type identifier indicating that status detector 372 has made the NG determination; the status log identifier indicating the reason for which status detector 372 has made the NG determination; and the value of a previously received message that corresponds to the value determined by status detector 372 as NG. The status log does not need to include the value determined by status detector 372 as NG and the ID of the received message.

The status log and the indication log each include: the log type identifier; the corresponding one of the status log identifier and the indication log identifier; the value determined by the corresponding one of status detector 372 and indication monitor 373 as NG; and also the ID of the received message as needed.

Here, the status log identifier and the indication log identifier, and the values that status detector 372 and indication monitor 373 have determined as NG will be described. FIG. 10 shows examples of a value determined as NG and included in a log according to the present embodiment. As shown in FIG. 10, a value to be generated as the log is determined depending on a determination function that has made the NG determination in status detector 372 or indication monitor 373. For example, when the ID determination function makes NG determination, the value determined by the ID determination function as NG is not included in the log. Log generation controller 376 generates a log including: the log type identifier; the status log identifier or the indication log identifier; and the ID of the received message.

When the data length determination function makes NG determination, the value of DLC included in the received message is set to a value determined as NG.

When the transmission cycle determination function makes NG determination, a reception time difference that is a time difference between a time of receiving a current message and a time of receiving an immediately prior message having the same ID as the ID of the current message is set to a value determined as NG.

When the transmission frequency determination function makes NG determination, a message reception frequency is set to a value determined as NG. In this process, when the determination is made in accordance with message reception frequencies of all received messages regardless of IDs included in the messages, the ID of the currently received message is not included in the log. On the other hand, if the determination is made for each ID and the result is NG, the ID of the currently received message may be included in the log.

When the data value determination function makes NG determination, as a value determined as NG, (i) a data identifier indicating a position of data item determined as NG out of data items included in the received message and (ii) a value of the determined data item are set to a log.

As the data identifier, a correspondence table may be created on an ID basis. In the correspondence table, for example, data from the 0th bit to the third bit corresponds to data identifier "1", data of the fourth bit corresponds to data identifier "2", and data from the fifth bit to the sixth bit corresponds to data identifier "3". Instead, a position of data may be indicated irrespective of ID by indicating, for example, data from the 0th bit to the third bit by data identifier "(0, 3)." Still instead, data from the 0th bit to the third bit may be indicated by data identifier "(0, 4)" by using the size of the data (4 bits).

The data identifier only needs to indicate a position of corresponding data in a data field in the format of a message in compliance with the CAN protocol. To this end, a data identifier other than those described above may be used.

When the vehicle state determination function makes NG determination, (i) a vehicle state identifier indicating a current state of the vehicle and (ii) cause information that is information causing the transition to the current state are set as the value determined as NG. When the state of the vehicle changes depending on the received message and the vehicle state determination function makes NG determination, the log includes the ID of the received message. On the other hand, when the state of the vehicle changes irrespective of the received message, the log does not include the ID of the received message. The cause information includes: a cause identifier indicating information that causes the transition of the state, such as the ID, the transmission cycle, the transmission frequency, the data value, or the amount of change in the data value; and the value of the cause identifier.

The log type identifier is an identifier indicating which has made NG determination among MAC verifier 371, status detector 372, and indication monitor 373. The status log identifier, which is an identifier indicating the reason for which status detector 372 has made the NG determination, and the indication log identifier, which is an identifier indicating a reason for which indication monitor 373 has made the NG determination, each indicate the reason for which the ID determination function, the data length determination function, the transmission cycle determination function, the transmission frequency determination function, the data value determination function, and the vehicle state determination function each make NG determination.

For example, the log type identifier indicates that a message having an ID that should not intrinsically be transmitted has been received, that the transmission cycle of the received message is smaller than a value described in the rule, that the value of data included in the payload of the received message differs from a value described in the rule, and that a difference between a value of a currently received data and a value of a previously received data differs from a value set in the rule.

Out of the ID determination function, the data length determination function, the transmission cycle determination function, the transmission frequency determination function, the data value determination function, and the vehicle state determination function included in each of status detector 372 and indication monitor 373, when a plurality of the functions determine one received message as NG or when any of the functions determines one single received message as NG for a plurality of reasons, log generation controller 376 may generate a plurality of logs to be outputted. Furthermore, log generation controller 376 may output as a log only a message having the highest priority among predetermined priorities.

Furthermore, log generation controller 376 notifies log-related information holder 377 of information relating to the received message, and requests log-related information holder 377 to hold the information. The information relating to the message may include, for example, the received message, the time when the message is received, a log generated and outputted by log generation controller 376, and information necessary for generation of the log. Log generation controller 376 acquires the information relating to the received message as required from log-related information holder 377 when generating the log.

Log-related information holder 377 holds the information relating to the received message as log generation controller 376 has requested. Log-related information holder 377 notifies log generation controller 376 of the held information in response to a request from log generation controller 376.

Log generation controller 376 may include the time when the message is received in the generated log.

[1.8 Configuration of ECU]

Figure 11:
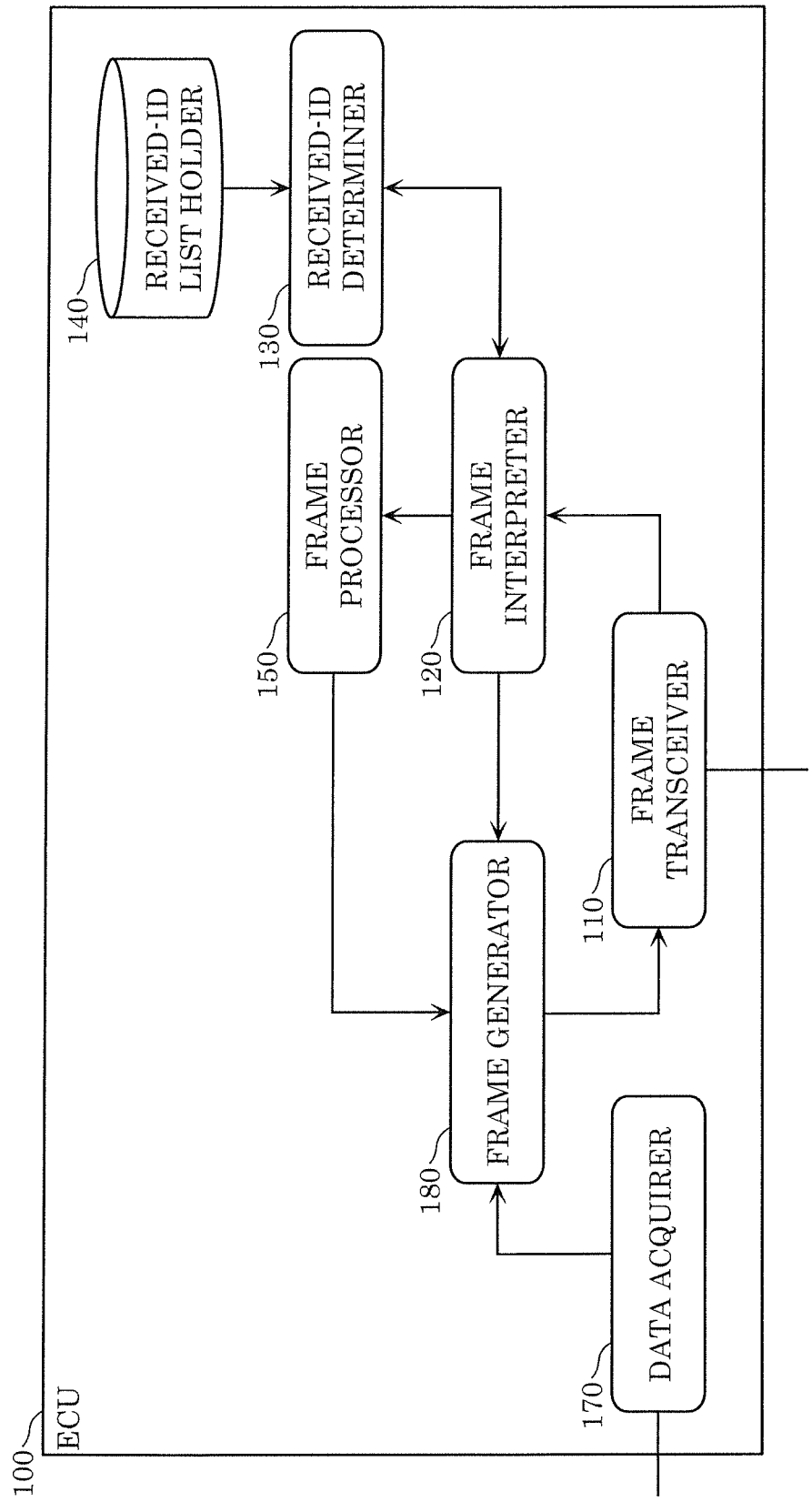
FIG. 11 is a block diagram showing an example of an ECU provided in the in-vehicle network system in Embodiment 1.

FIG. 11 is a block diagram showing an example of an ECU included in the in-vehicle network system according to the present embodiment. In FIG. 11, ECU 100 includes frame transceiver 110, frame interpreter 120, received-ID determiner 130, received-ID list holder 140, frame processor 150, data acquirer 170, and frame generator 180.

The configuration above is a functional configuration, and ECU 100 is provided as an information processing device including a processing unit achieved, for example, by a processor, a storage achieved, for example, by a semiconductor memory, an input/output unit achieved, for example, by input/output ports, and other components.

The functional configuration above is achieved by causing the processing unit to read and execute a program held in the storage and record predetermined data in the storage. The configuration may instead be achieved by transmitting and receiving data via the input/output unit instead of recording predetermined data in the storage. The configuration above may still instead be achieved by the combination thereof.

Frame transceiver 110 transmits and receives a message according to the CAN protocol via bus 200.

More specifically, frame transceiver 110 reads a message sent to bus 200 in such a way that the message is read by 1 bit at a time and transfers the read message to frame interpreter 120.

Frame transceiver 110 sends a message notified by frame generator 180 to bus 200.

Frame interpreter 120 receives the values of the message from frame transceiver 110 and maps the values in the fields in the CAN protocol to interpret the message. Frame interpreter 120 transfers a series of values interpreted as the ID field to received-ID determiner 130.

Frame interpreter 120 further determines whether the values of the ID field of the message and the data field located after the ID field are transferred to frame processor 150 or the reception of the message is terminated in accordance with the determination result notified by received-ID determiner 130.

When the result of the determination shows that the received message is a message that does not comply with the CAN protocol, frame interpreter 120 requires frame generator 180 to transmit an error frame.

When the interpretation performed by frame interpreter 120 shows that an error frame transmitted by another node is received, frame interpreter 120 discards the message being read.

Received-ID determiner 130 receives the values of the ID field from frame interpreter 120 and determines in accordance with a list of message IDs held by received-ID list holder 140 whether or not the read message is received. Received-ID determiner 130 notifies frame interpreter 120 of the result of the determination.

Received-ID list holder 140 holds the received ID list received by ECU 100. The received ID list has the same format as that shown in FIG. 4 and will therefore not be described.

Frame processor 150 performs process according to the data in the received message. The content of the process varies among ECUs 100.

For example, ECU 100a performs the process of issuing alarm sound upon reception of a message indicating that a door is open when the automobile travels at a speed faster than 30 km/hour. When the door is opened in a state in which ECU 100c receives a message indicating that no brake is applied, ECU 100c performs the process of issuing alarm sound.

The process described above has been presented only by way of example for description, and ECU 100 may perform a process other than the process described above. To perform such a process, frame processor 150 causes frame generator 180 to generate a frame to be sent by frame processor 150.

Data acquirer 170 acquires output data indicating the state of an instrument connected to ECU 100 or a value measured or otherwise provided with a detector and transfers the output data to frame generator 180.

Frame generator 180 configures an error frame in accordance with a requirement from frame interpreter 120 for transmission of an error frame and sends the error frame to frame transceiver 110.

Frame generator 180 configures a message frame with a predetermined message ID attached thereto in accordance with the value of the data received from data acquirer 170 and sends the message frame to frame transceiver 110.

[1.9 Configuration of Server]

Figure 12:
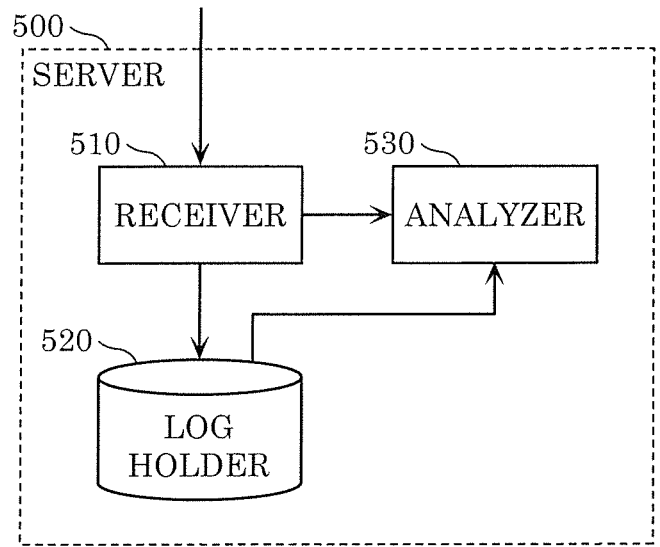
FIG. 12 is a block diagram showing an example of a server provided in the in-vehicle network system in Embodiment 1.

FIG. 12 is a block diagram showing an example of the server provided in the in-vehicle network system according to the present embodiment. In FIG. 12, server 500 includes receiver 510, log holder 520, and analyzer 530.

Receiver 510 receives a log from log generation controller 376 via external communicator 390 of gateway 300. Receiver 510 requests log holder 520 to hold the received log.

Log holder 520 holds the log in accordance with the request from receiver 510. Log holder 520 transmits the held log in accordance with a request from analyzer 530.

Analyzer 530 acquires the log from log holder 520 and analyzes the log to analyze whether anomaly has occurred in the vehicle.

To hold a log, log holder 520 may hold logs separately on a vehicle basis, may hold logs of vehicles with the logs integrated with one another, or may hold both logs on a vehicle basis and the integrated logs of the vehicles. To integrate logs of vehicles with one another, the logs may be all integrated with one another, the logs may be integrated with one another on a vehicle manufacturer basis, on a vehicle model basis, or a vehicle grade basis, or the logs may be integrated with one another on a vehicle class basis determined by the size, displacement, or any other factor of the vehicle. To integrate logs of vehicles with one another, the logs of the vehicles may instead be integrated with one another on a vehicle registered address basis or on a vehicle function basis (examples of function include automatic driving function, driving assistance function, and communication function). The method for integrating logs of vehicles may still instead be the combination of the methods described above.

Server 500 may include a display unit (not shown) for displaying the received log or the result of the analysis performed by analyzer 530.

[1.10 Anomaly Detecting Process]

Figure 13:
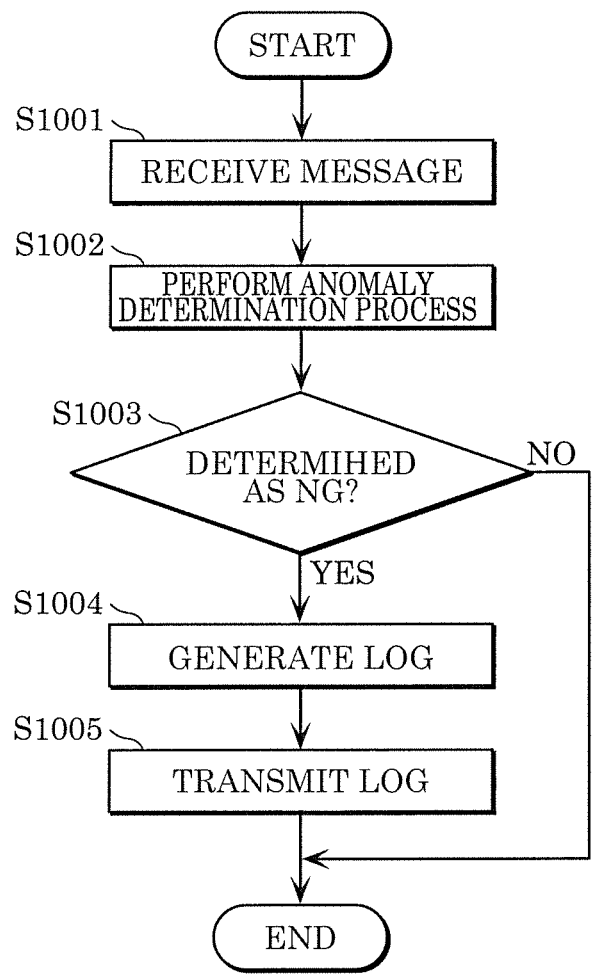
FIG. 13 is a flowchart showing an example of an anomaly detecting process in Embodiment 1.

FIG. 13 is a flowchart showing an example of an anomaly detecting process according to the present embodiment.

Anomaly detecting processing function group 370 first receives a message from frame processor 350 (step S1001).

MAC verifier 371, status detector 372, and indication monitor 373 in anomaly detecting processing function group 370 each make determination on the message received from frame processor 350 (S1002).

Log generation controller 376 checks whether or not the results of the determination performed by MAC verifier 371, status detector 372, and indication monitor 373 include the determination result of NG (S1003).

When all the determination results are OK (in the case of No in step S1003), the entire procedure is terminated.

When the results of the determination performed by MAC verifier 371, status detector 372, and indication monitor 373 include the determination result of NG (in the case of Yes in step S1003), log generation controller 376 generates a log (step S1004).

Log generation controller 376 transmits the generated log to the server via external communicator 390 (S1005). Log generation controller 376 terminates the entire procedure at this point.

[1.11 Transfer Process]

Figure 14:
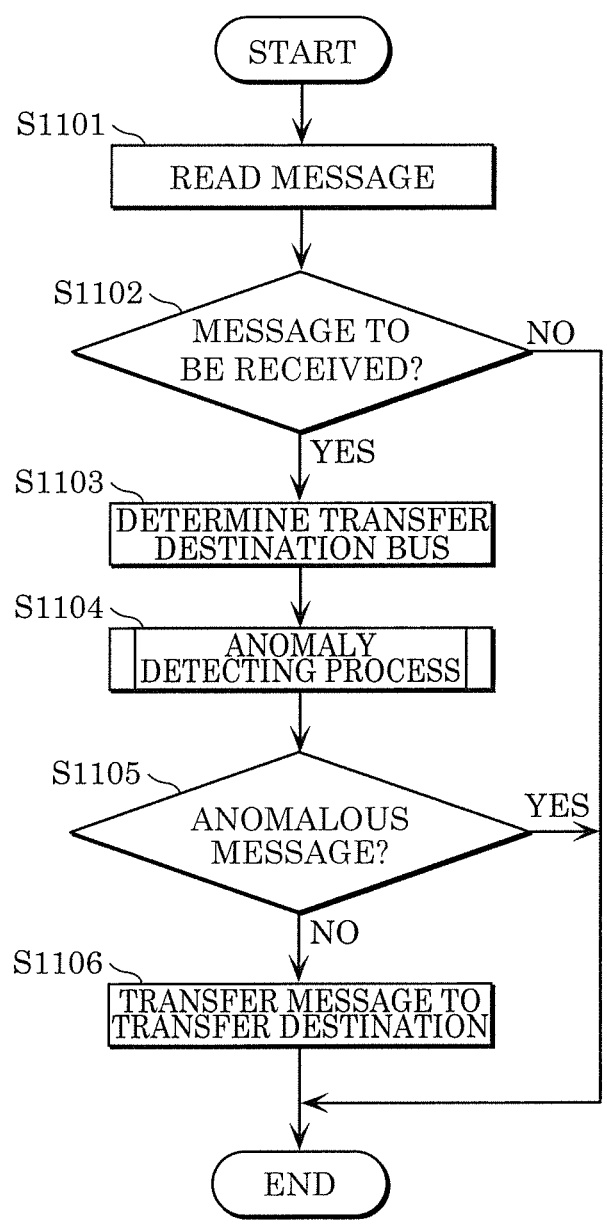
FIG. 14 is a flowchart showing an example of a transfer process in Embodiment 1.

FIG. 14 is a flowchart showing an example of a transfer process according to the present embodiment. Since the transfer process performed by gateway 300 is practically a common process irrespective of the transfer direction, a case where gateway 300 transfers a message received via bus 200a to bus 200b will be described by way of example.

Frame transceiver 310 first reads the message via bus 200a (step S1101). Frame transceiver 310 then notifies frame interpreter 320 of data in each field of the read message.

Frame interpreter 320 then cooperates with received-ID determiner 330 to determine in accordance with the values of the ID field (message ID) of the read message whether or not the read message is a message to be received and processed (step S1102).

When frame interpreter 320 determines that the read message is not a message to be processed (No in step S1102), the message is not transferred.

When frame interpreter 320 determines that the read message is a message to be received and processed (Yes in step S1102), the value of each field in the message is transferred to frame processor 350.

Frame processor 350 then determines a transfer destination bus in accordance with the transfer rules held in transfer rule holder 360 (step S1103).

Frame processor 350 notifies anomaly detecting processing function group 370 of the value of each field in the message received from frame interpreter 320 and requires anomaly detecting processing function group 370 to determine whether or not the received message is anomalous. Anomaly detecting processing function group 370 determines whether or not the notified message is anomalous in accordance with the value of each field of the notified message and notifies frame processor 350 of the result of the determination (step S1104).

When anomaly detecting processing function group 370 determines that the message is anomalous (in the case of Yes in step S1105), the message is not transferred.

When anomaly detecting processing function group 370 determines that the message is not anomalous but is a normal message (in the case of No in step S1105), frame processor 350 requires frame generator 380 to transfer the message to the transfer destination bus determined in step S1103.

Frame generator 380 generates a message to be received by the specified transfer destination in response to the requirement from frame processor 350 and causes frame transceiver 310 to send the message (step S1106).

In the example described above, after determining the destination to which the received message is to be transferred (step S1103), a determination is made as to whether or not the message is anomalous (step S1104), but the present disclosure is not limited to the above. After determining whether or not the received message is anomalous, the destination to which the message is transferred may be determined. The determination of the destination to which the received message is transferred and determination of whether or not the message is anomalous may be performed concurrently.

[1.12 Effects]

According to the present embodiment, anomaly detecting processing function group 370 monitors a message flowing through the network of the in-vehicle network system. When anomaly detecting processing function group 370 detects anomaly, log generation processing function group 375 generates a log and outputs the log to server 500. Server 500 accumulates the logs and analyzes the logs to be capable of detecting anomaly that has not been successfully detected by anomaly detecting processing function group 370. In a conventional anomaly detecting technology, for example, the technology for determining that an anomaly has occurred when a message is received at time intervals shorter than a predetermined cycle, there is the message that is difficult to determine whether the message is normal or anomalous. Even for such the message, it is possible to determine whether or not the message is anomalous with high accuracy using a large number of logs. As a result, the safety of the in-vehicle network system can be increased.

[2. Other Variations]

The present disclosure is, of course, not limited to the embodiment described above, and a form in which a variety of variations that those skilled in the art conceive of are made to the embodiment and a form configured by combining the components in different embodiments with one another fall within the scope of the present disclosure without departing from the spirit of the present disclosure. For example, the following variations are encompassed in the present disclosure.

(1) In the embodiment described above, anomaly detecting processing function group 370 includes MAC verifier 371, status detector 372, and indication monitor 373, but the present disclosure is not limited to the above. For example, anomaly detecting processing function group 370 may include MAC verifier 371 and status detector 372, may include MAC verifier 371 and indication monitor 373, or may include status detector 372 and indication monitor 373.

Still instead, anomaly detecting processing function group 370 may include only MAC verifier 371, may include only status detector 372, or may include only indication monitor 373.

In each of the cases described above, as an example of the determination performed by log generation controller 376, for example, log generation controller 376 may output a log corresponding to a case where the omitted processing unit out of MAC verifier 371, status detector 372, and indication monitor 373 provides the determination result of OK in FIG. 9.

That is, in the case where anomaly detecting processing function group 370 includes MAC verifier 371 and status detector 372, log generation controller 376 generates any of the logs corresponding to the rows where the "INDICATION MONITORING" column in FIG. 9 shows OK and the "MAC VERIFICATION" and "STATUS DETECTING" columns in FIG. 9 each show OK or NG.

(2) The embodiment described above has described that gateway 300 includes frame transceiver 310, frame interpreter 320, received-ID determiner 330, received-ID list holder 340, frame processor 350, transfer rule holder 360, anomaly detecting processing function group 370, log generation processing function group 375, frame generator 380, and external communicator 390, but the structure of gateway 300 is not limited to the above.

Figure 15:
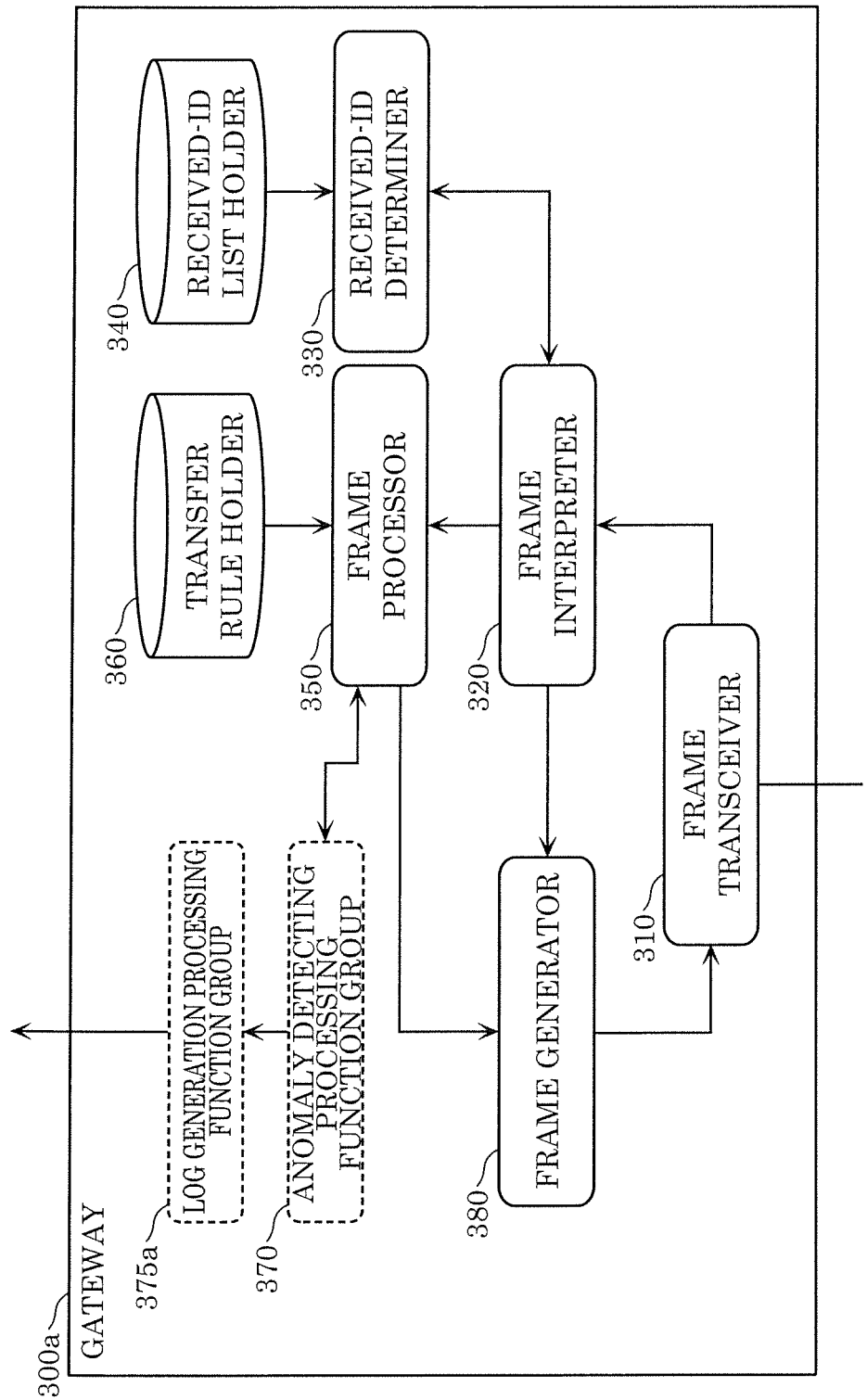
FIG. 15 is a block diagram showing an example of a gateway in a variation.

FIG. 15 is a block diagram showing an example of a gateway in a variation. Gateway 300a includes frame transceiver 310, frame interpreter 320, received-ID determiner 330, received-ID list holder 340, frame processor 350, transfer rule holder 360, anomaly detecting processing function group 370, log generation processing function group 375a, and frame generator 380, as shown in FIG. 15.

Figure 16:
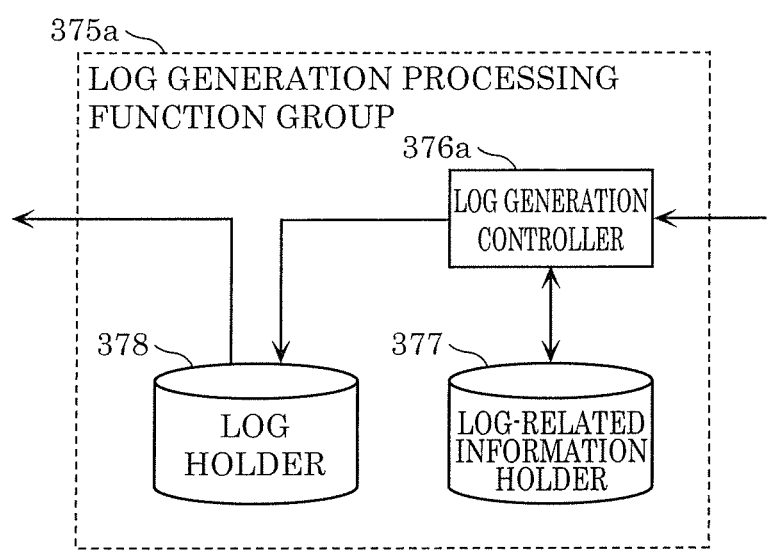
FIG. 16 is a block diagram showing an example of a log generation processing function group in the variation.

FIG. 16 is a block diagram showing an example of the log generation processing function group in the variation. In FIG. 16, log generation processing function group 375a includes log generation controller 376a, log-related information holder 377, and log holder 378.

Log generation controller 376 in Embodiment 1 outputs a log to server 500 via external communicator 390, whereas log generation controller 376a outputs a log to log holder 378.

Log holder 378 receives the log from log generation controller 376a and holds the received log.

When an instrument (not shown) located external to gateway 300a and connected thereto requests log holder 378 to acquire a log, log holder 378 outputs the held log.

Gateway 300a in the embodiment described above may include log generation processing function group 375a in place of log generation processing function group 375, and log holder 378 may output the held log via external communicator 390 in accordance with a requirement from an instrument external to gateway 300a.

Figure 17:
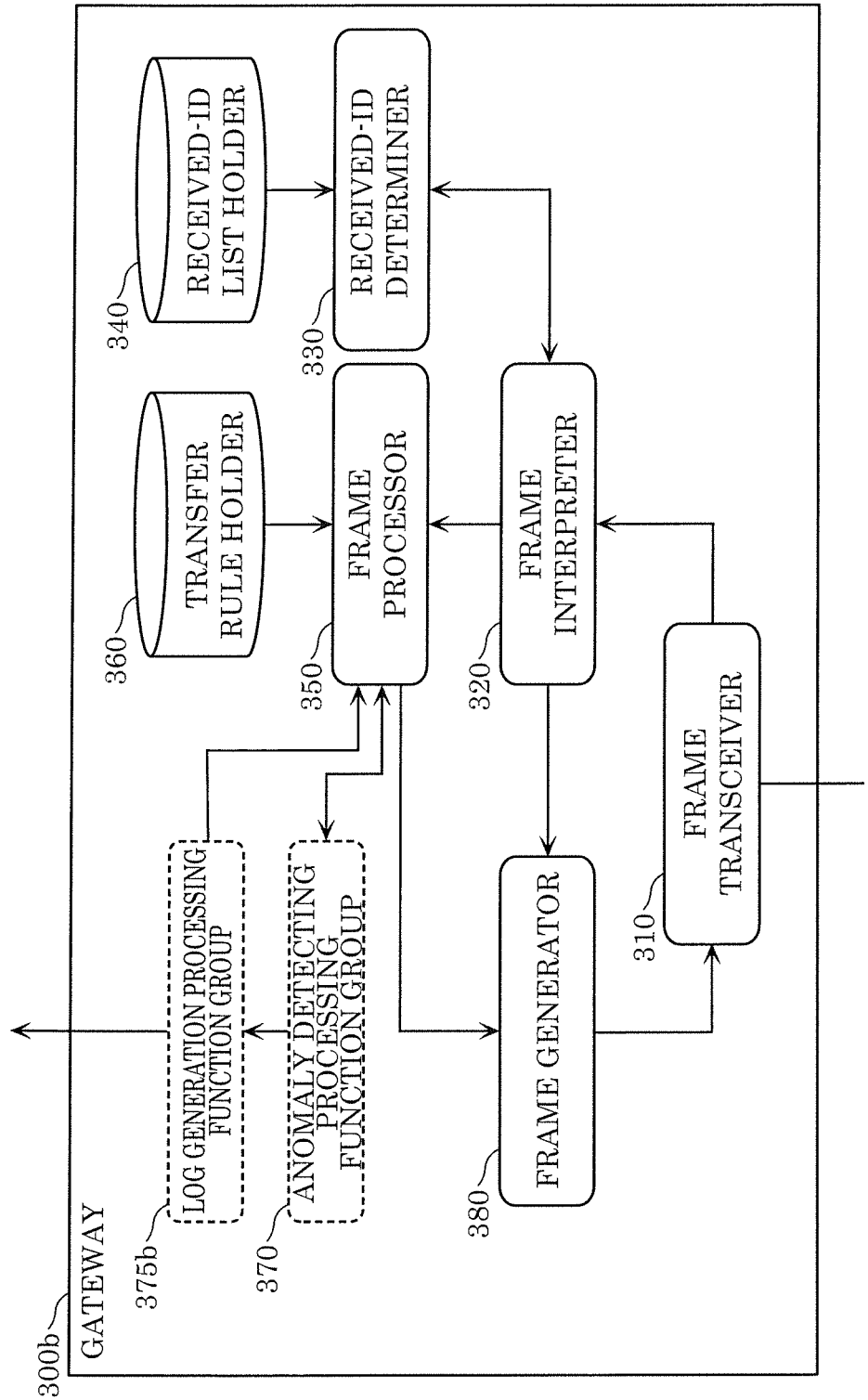
FIG. 17 is a block diagram showing an example of a gateway in a variation.

Log generation processing function group 375a may receive a log acquisition request via bus 200 from another instrument connected to bus 200 and output a log via bus 200. FIG. 17 is a block diagram showing an example of gateway 300b in a variation. Log generation processing function group 375b outputs a log to bus 200 via frame processor 350, as shown in FIG. 17.

A log can thus be held in gateway 300b. Therefore, even when gateway 300b has no function of all-time connection to server 500, logs can be collected, held, and output to an instrument external to gateway 300b as required, whereby log output timing can be flexibly selected, or communication cost can be suppressed.

(3) The embodiment described above has described that ECU 100 includes frame transceiver 110, frame interpreter 120, received-ID determiner 130, received-ID list holder 140, frame processor 150, data acquirer 170, and frame generator 180, but the configuration of ECU 100 provided in the in-vehicle network system in the present disclosure is not limited to the above.

Figure 18:
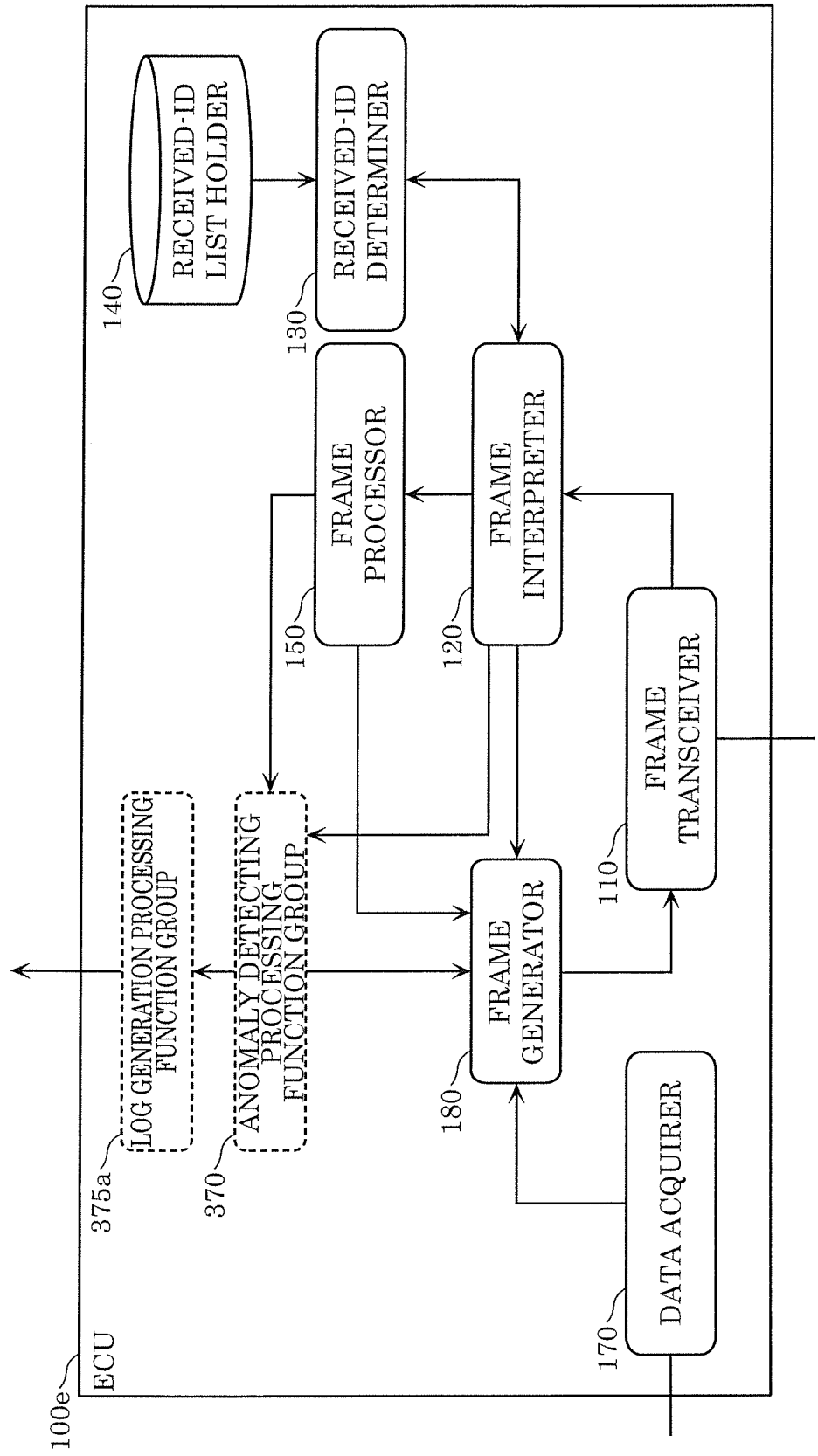
FIG. 18 is a block diagram showing an example of an ECU in a variation.

FIG. 18 is a block diagram showing an example of an ECU in a variation. In FIG. 18, ECU 100e further includes anomaly detecting processing function group 370 and log generation processing function group 375a in addition to the configuration of ECU 100. In ECU 100e, frame processor 150 may require anomaly detecting processing function group 370 or frame interpreter 120 may require anomaly detecting processing function group 370 to determine whether or not a received message is anomalous.

Figure 19:
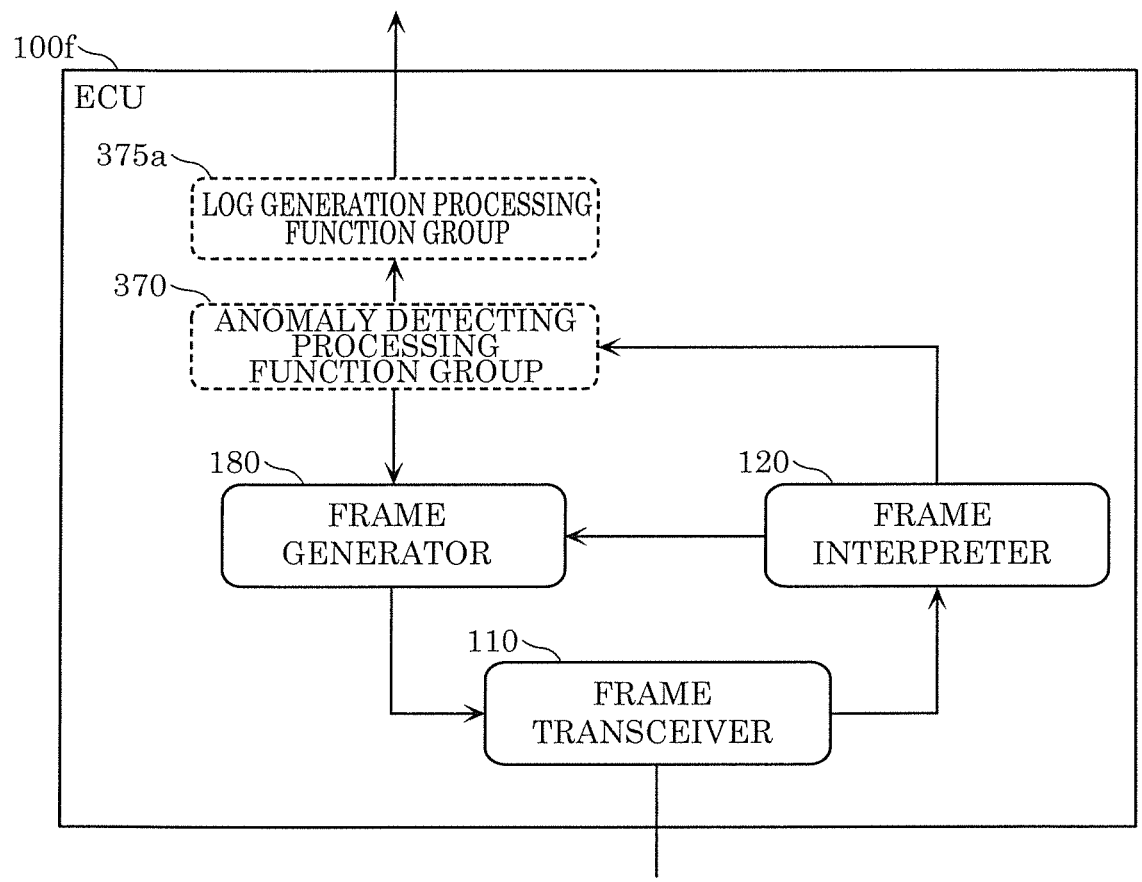
FIG. 19 is a block diagram showing an example of an ECU in a variation.

FIG. 19 is a block diagram showing an example of an ECU in a variation. In FIG. 19, ECU 100f includes frame transceiver 110, frame interpreter 120, frame generator 180, anomaly detecting processing function group 370, and log generation processing function group 375a. Frame interpreter 120 may, for example, receive all messages irrespective of the ID and request anomaly detecting processing function group 370 to determine whether or not each of the messages is anomalous.

ECU 100f may further include received-ID determiner 130 and received-ID list holder 140 in addition to the configuration shown in FIG. 19 and may receive only a message having any of the message IDs written in the received ID list held by the received-ID list holder. ECU 100f may request anomaly detecting processing function group 370 to determine whether or not the message is anomalous.

Log generation processing function group 375a may be replaced with log generation processing function group 375 described above. ECU 100e or ECU 100f may further include external communicator 390 as log generation processing function group 375a.

Not only can the gateway but the ECU can therefore output a log for analysis of whether or not a message transmitted to the bus is anomalous. As a result, for example, the redundancy of the mechanism for anomaly detecting in the in-vehicle network system is improved, whereby more safety of the in-vehicle network system can be ensured.

Figure 20:
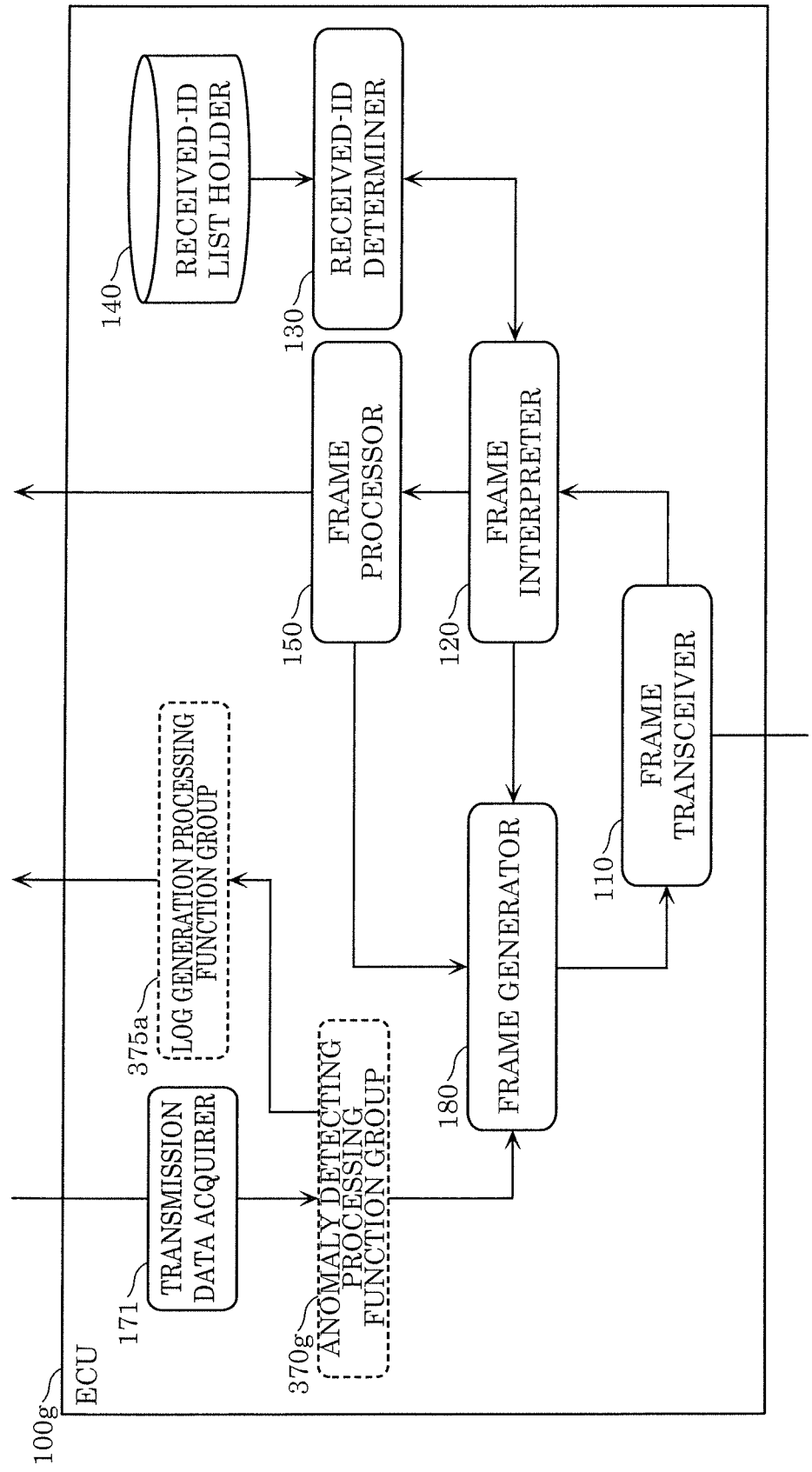
FIG. 20 is a block diagram showing an example of an ECU in a variation.

FIG. 20 is a block diagram showing an example of an ECU in a variation. ECU 100g shown in FIG. 20 may include transmission data acquirer 171, which acquires data transmitted to bus 200, for example, from another connected instrument or an external instrument, anomaly detecting processing function group 370g, and log generation processing function group 375a. Anomaly detecting processing function group 370g, with which ECU 100g is provided, may also determine whether or not data received from transmission data acquirer 171 is anomalous. Only when the data is not anomalous, ECU 100g may request frame generator 180 to transmit the message.

The configuration of log generation processing function group 375a may be replaced with log generation processing function group 375, and ECU 100g may further include external communicator 390.

Therefore, for example, when an anomalous message is transmitted from a car navigation system anomalously controlled by a malicious third party toward, for example, the in-vehicle network system, ECU 100g used in conjunction with the car navigation system allows server 500 to analyze logs to suppress diffusion of the anomalous message in the in-vehicle network system. Furthermore, transmission of an anomalous message from a location outside the vehicle into the in-vehicle network system can be suppressed.

(4) In the embodiment described above, gateway 300 includes frame transceiver 310, frame interpreter 320, received-ID determiner 330, received-ID list holder 340, frame processor 350, transfer rule holder 360, anomaly detecting processing function group 370, log generation processing function group 375, frame generator 380, and external communicator 390, but the present disclosure is not limited to the above.

Figure 21:
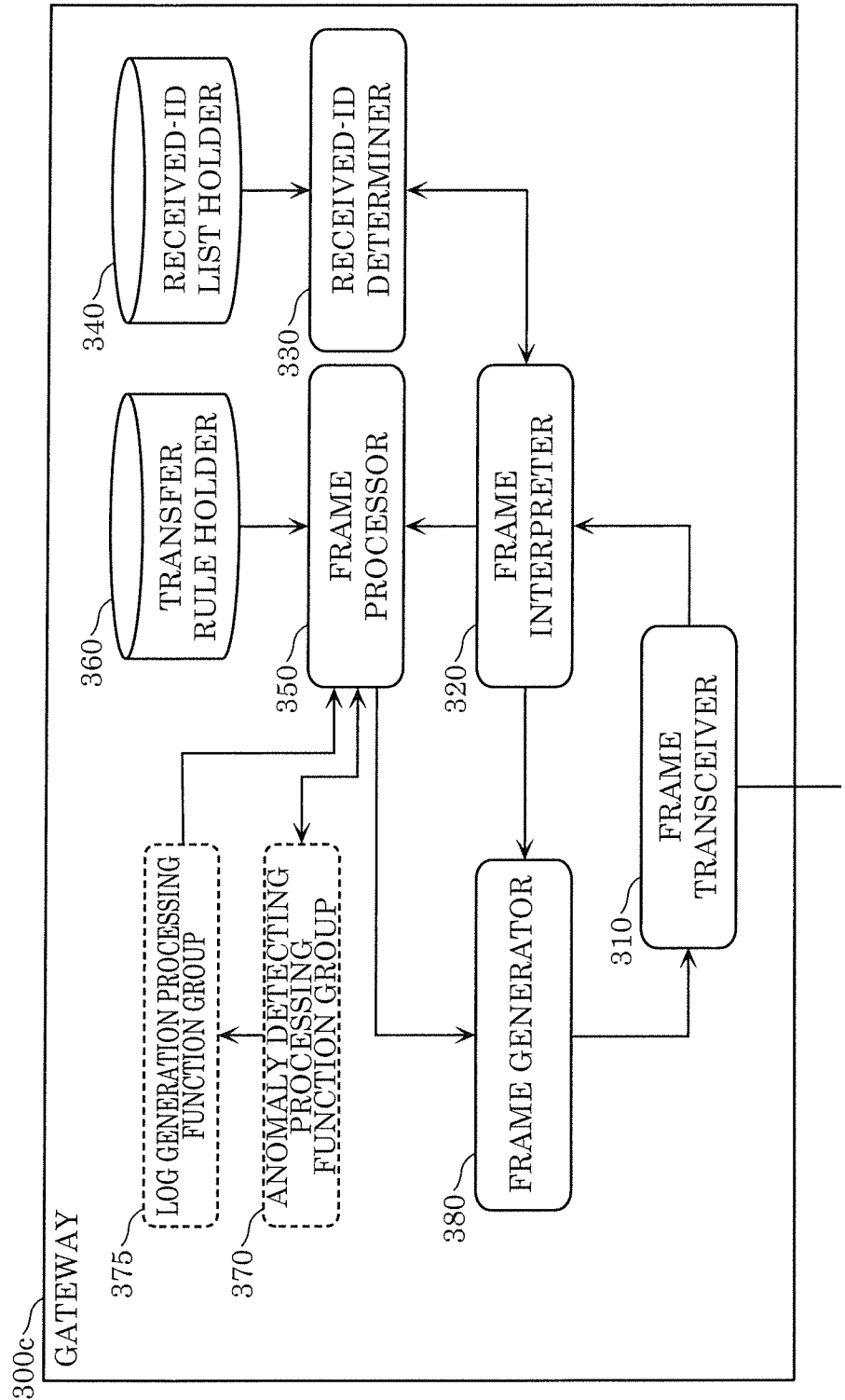
FIG. 21 is a block diagram showing another example of a gateway in a variation.

FIG. 21 is a block diagram showing an example of a gateway in a variation. Gateway 300c includes frame transceiver 310, frame interpreter 320, received-ID determiner 330, received-ID list holder 340, frame processor 350, transfer rule holder 360, anomaly detecting processing function group 370, log generation processing function group 375, and frame generator 380, as shown in FIG. 21.

Log generation processing function group 375 requests frame processor 350 to transmit the log information not to output a log to server 500 via external communicator 390 but to output a log to ECU 100h via bus 200.

Figure 22:
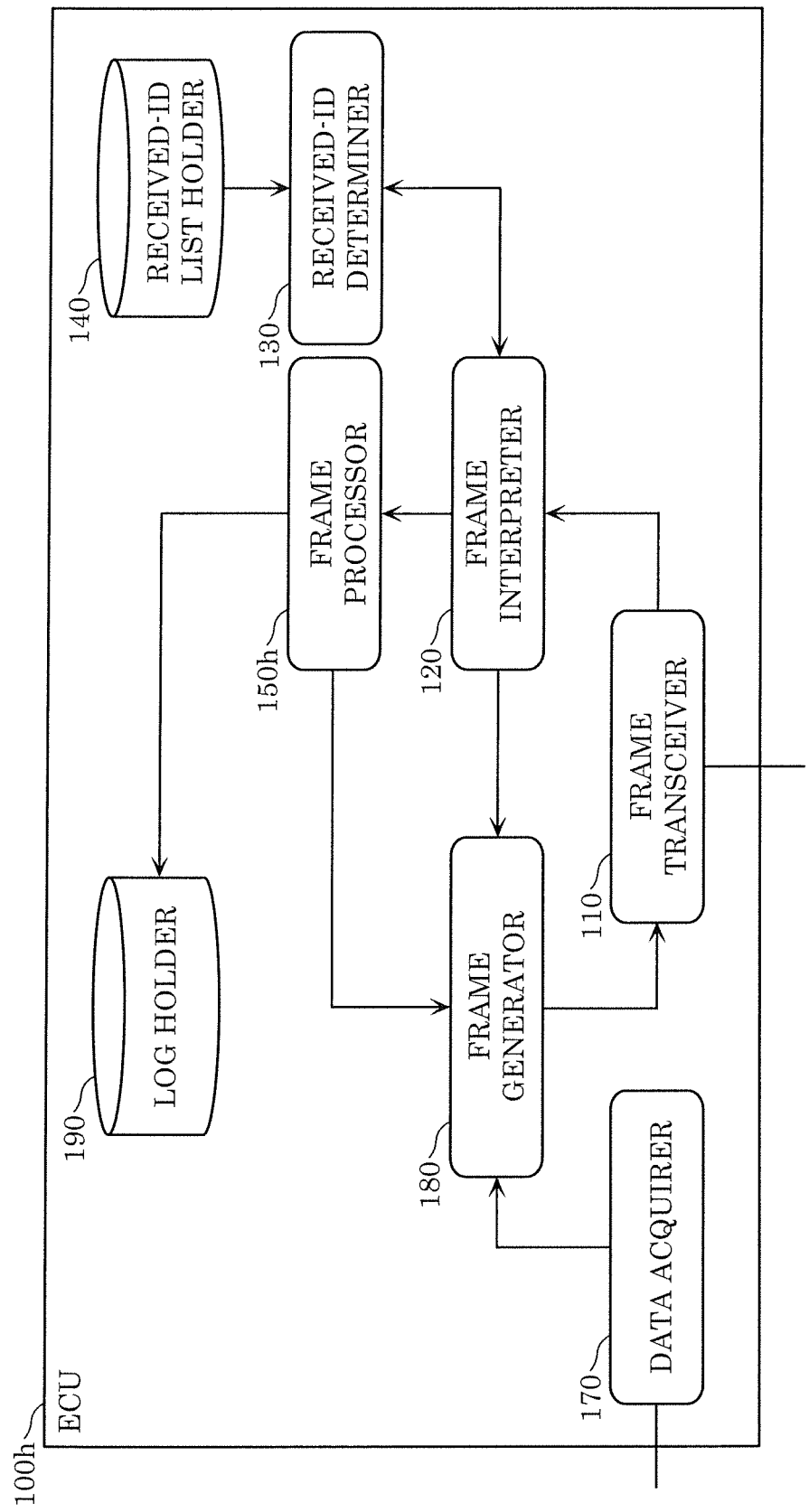
FIG. 22 is a block diagram showing an example of an ECU in a variation.

FIG. 22 is a block diagram showing an example of an ECU in a variation. In FIG. 22, ECU 100h includes log holder 190 in addition to the configuration of ECU 100 and includes frame processor 150h in place of frame processor 150.

Frame processor 150h notifies log holder 190 that a received message is a log and requests log holder 190 to hold the log. Frame processor 150h determines by using the ID of the received message whether the received message is a log. When the ID of the received message is the ID showing a log determined in advance, frame processor 150h determines that the received message is a log and notifies log holder 190 that the received message is a log.

ECU 100e, ECU 100f, or ECU 100g may include log generation processing function group 375, and log generation processing function group 375 may request frame processor 150 to transmit a log.

(5) The embodiment described above is not limited to the case where gateway 300c or ECU 100h outputs a log to server 500, the case where gateway 300c or ECU 100h outputs a log in accordance with a request while holding the log therein, and the case where gateway 300c or ECU 100h outputs a log to another ECU 100h.

For example, gateway 300c or ECU 100h may output a log to server 500 while holding the log therein. Gateway 300c or ECU 100h may output a log to another ECU 100h while holding the log therein. Gateway 300c or ECU 100h may output a log to another ECU 100h while outputting the log to server 500. Gateway 300c or ECU 100h may output a log to server 500 and another ECU 100h while holding the log therein.

In each of the cases described above, the same log may be outputted, or a log to be outputted may be determined on an output destination basis. For example, when gateway 300c or ECU 100h can hold only a small amount of log and another ECU 100h or server 500 can hold a large amount of log, gateway 300c or ECU 100h may hold only information on the identifiers, and another ECU 100h or server 500 may hold a value determined as NG or a log of all the fields of a CAN message. Instead, gateway 300c or ECU 100h may hold information that can identify a log, and another ECU 100h or server 500 may hold the log along with the information that can identify the log. Still instead, all received messages may be outputted as a log to another ECU 100h irrespective of the result of the detecting performed by anomaly detecting processing function group 370.

Log generation controller 376 may determine a target to which a log is to be outputted in accordance with the results of the determination performed by MAC verifier 371, status detector 372, and indication monitor 373.

For example, when MAC verifier 371 makes NG determination, server 500 is notified that MAC verifier 371 has made the NG determination, and the "total field log" may be outputted to another ECU 100h. When status detector 372 makes NG determination, the "status log" may be outputted to another ECU 100h, or the "status log" may be outputted to another ECU 100h while gateway 300c or ECU 100h holds the log type identifier and the status log identifier included in the "status log." In addition, the "status log" may be outputted to server 500, and a log formed of the "status log" to which all the fields of the received message are added may be outputted to another ECU 100h while gateway 300c or ECU 100h holds the log type identifier and the status log identifier included in the "status log."

When indication monitor 373 makes NG determination, the "indication log" may be outputted to another ECU 100h, or the "indication log" may be outputted to another ECU 100h while gateway 300c or ECU 100h holds the log type identifier and the indication log identifier included in the "indication log." In addition, the "indication log" may be outputted to server 500, and a log formed of the "indication log" to which all the fields of the received message are added may be outputted to another ECU 100h while gateway 300c or ECU 100h holds the log type identifier and the indication log identifier included in the "indication log."

The patterns of individual log generation actions are not limited to the patterns described above and may be the combination of the patterns described above.

(6) In the embodiment described above, the case where a received message is not transferred as an action according to detected anomaly, but the present disclosure is not limited to the above. For example, gateway 300c or ECU 100h including anomaly detecting processing function group 370 described above may make the message being received via the network invalid by transmitting an error frame when the anomaly detecting process performed during the reception of the message determines that the message is anomalous.

The configuration described above can prevent another ECU 100h connected to a bus where an anomalous message has been found from receiving the anomalous message. This is also applicable to a message that is not transferred.

Gateway 300c or ECU 100h including anomaly detecting processing function group 370 described above may further notify, for example, a user or an external server of occurrence of anomaly, record the occurrence of anomaly in a log, or cause the vehicle to transition to a fail-safe mode thereof.

Anomaly can thus be flexibly handled after the anomaly is detected. A plurality of messages each determined as being anomalous may be handled as one or more series of data, and data values or the set of reception intervals may be learned as an anomalous label for each of the series.

(7) In the embodiment described above, an ID in the standard format has been presented by way of example, and an ID in an extended format may be used.

(8) In the embodiment described above, a message is transmitted in the form of a plain text by way of example, and a message may be ciphered. Furthermore, a message may include a message authentication code.

(9) In the embodiment described above, a normal model and a reception log are held in the form of a plain text by way of example, and a normal model and a reception log may be ciphered and then held.

(10) In the embodiment described above, the in-vehicle network has been presented as an example of the network communication system that performs communication according to the CAN protocol. The technology according to the present disclosure is not necessarily used in an in-vehicle network and may be used, for example, in a network communication system that performs communication according to a CAN protocol that is not used in an in-vehicle network, such as CAN protocols used in a robot and an industrial instrument.

The CAN protocol is used as the protocol used in an in-vehicle network, but the present disclosure is not limited to the above. For example, CAN with flexible data rate (CAN-FD), FlexRay, Ethernet, local interconnect network (LIN), or media oriented systems transport (MOST) may be used. A combined network using the networks described above as sub-networks may instead be used.

(11) An example of each device according to the above-described embodiments is a computer system including a microprocessor, a Read Only Memory (ROM), a Random Access Memory (RAM), a hard disk unit, a display unit, a keyboard, a mouse, and the like. The RAM or the hard disk unit holds a computer program. The microprocessor operates according to the computer program, thereby causing the constituent elements to execute their functions. Here, the computer program includes combinations of instruction codes for issuing instructions to the computer to execute predetermined functions.

(12) It should also be noted that a part or all of the constituent elements in each of the devices according to the above-described embodiments may be implemented into a single Large Scale Integration (LSD. The system LSI is a super multi-function LSI that is a single chip into which a plurality of constituent elements are integrated. More specifically, the system LSI is a computer system including a microprocessor, a ROM, a RAM, and the like. The RAM holds a computer program. The microprocessor operates according to the computer program, thereby causing each of the constituent elements to execute their functions.

Each of the constituent elements included in each of the above-described devices may be integrated separately, or a part or all of them may be integrated into a single chip.

LSI is described here, but the integrated circuit may also be referred to as an integrated circuit (IC), a system LSI circuit, a super LSI circuit or an ultra LSI circuit depending on the degree of integration. Moreover, the circuit integration technique is not limited to LSI, and may be realized by a dedicated circuit or a general purpose processor. After manufacturing of the LSI circuit, a field programmable gate array (FPGA) or a reconfigurable processor which is reconfigurable in connection or settings of circuit cells inside the LSI circuit may be used.

Furthermore, when development of a semiconductor technology or another derived technology provides a circuit integration technology which replaces LSI, as a matter of course, functional blocks may be integrated by using this technology. Adaption of biotechnology, for example, is a possibility.

(13) It should also be noted that a part or all of the constituent elements included in each of the above-described devices may be implemented into an Integrated Circuit (IC) card or a single module which is attachable to and removable from the device. The IC card or the module is a computer system including a microprocessor, a ROM, a RAM, and the like. The IC card or the module may include the above-described super multi-function LSI. The microprocessor operates according to the computer program to cause the IC card or the module to execute its functions. The IC card or the module may have tamper resistance.

(14) The present disclosure may be the above-above described methods. These methods may be a computer program executed by a computer, or digital signals forming the computer program.

The present disclosure may be a computer-readable recording medium on which the computer program or the digital signals are recorded. Examples of the computer-readable recording medium are a flexible disk, a hard disk, a Compact Disc-Read Only Memory (CD-ROM), a magnetooptic disk (MO), a Digital Versatile Disc (DVD), a DVD-ROM, a DVD-RAM, a BD (Blu-ray® Disc), and a semiconductor memory. The present disclosure may be the digital signals recorded on the recording medium.

The present disclosure may be implemented by transmitting the computer program or the digital signals via an electric communication line, a wired or wireless communication line, a network represented by the Internet, data broadcasting, and the like.

The present disclosure may be a computer system including a microprocessor and a memory. The memory stores the computer program and the microprocessor operates according to the computer program.

It is also possible that the program or the digital signals may be recorded onto the recording medium to be transferred, or may be transmitted via a network or the like, so that the program or the digital signals can be executed by a different independent computer system.

(15) The above-described embodiments and the above-described variations may be combined.

In the embodiment and the variations thereof, a message used as a reference of the anomalous communication detecting is determined by a gateway or an ECU connected to an in-vehicle network system for communication or the combination of the gateway or ECU and a server computer.

A system that performs the anomalous communication detecting and includes one or more processors and storages is called an anomalous communication detecting reference determination system in the present disclosure.

The anomalous communication detecting reference determination system therefore also includes a system achieved by a single device, such as a single gateway connected to an in-vehicle network system, and a system achieved by a plurality of devices, such as the combination of a gateway and an ECU or the combination of a gateway or an ECU and a remote server computer. The technology in the embodiment and the variations thereof described above can be achieved in the form of a method including part or entirety of the process steps performed by components or a program that is executed by a processor of the anomalous communication detecting reference determination system to allow the anomalous communication detecting reference determination system to perform the method.

In the above-described embodiments and variations, steps in the processing performed by a certain constituent element may be performed by another constituent element, an order of steps may be changed, or a plurality of steps may be performed in parallel.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The log generation method and the like according to the present disclosure determines reference time for detecting anomaly by determining whether or not arbitration has occurred when a message is transmitted. It is therefore possible to accurately determine whether some message, for which the conventional techniques have a difficulty to make such determination, is normal or anomalous, thereby protecting the security of in-vehicle networks.

What is claimed is:

1. A log generation method for generating a log of communication on an in-vehicle network, the log generation method comprising:
    performing a plurality of determination processes for determining, by using different methods, whether or not a message sent to the in-vehicle network is anomalous;
    generating a log in accordance with results of the plurality of determination processes; and
    transmitting the generated log,
    wherein the generating includes determining at least one information item to be included in the log in accordance with a combination of the results of the plurality of determination processes,
    the plurality of determination processes includes a first determination process for determining that the message is anomalous and a second determination process for determining that the message is anomalous, the first determination process and the second determination process being performed independently from each other, and
    in the generating,
    in a case where the first determination process and the second determination process both determine independently that the message is anomalous,
    (A) when a reason for which the first determination process determines that the message is anomalous is different from a reason for which the second determination process determines that the message is anomalous, the at least one information item is:
        a first type identifier indicating that the first determination process determines that the message is anomalous;
        first information item indicating the reason for which the first determination process determines that the message is anomalous;
        a second type identifier indicating that the second determination process determines that the message is anomalous; and
        second information item indicating the reason for which the second determination process determines that the message is anomalous, and
    (B) when the reason for which the first determination process determines that the message is anomalous is same as the reason for which the second determination process determines that the message is anomalous, the at least one information item is:
        the first type identifier;
        the second type identifier; and
        one of the first information item and the second information item.

2. The log generation method according to claim 1, wherein the plurality of determination processes includes as one of the different methods a Message Authentication Code (MAC) verification process of verifying a MAC of the message to determine whether or not the message is anomalous.

3. The log generation method according to claim 1,
wherein the plurality of determination processes includes as one of the different methods a status detecting process of detecting status of a vehicle in accordance with the message to determine whether or not the message is anomalous.

4. The log generation method according to claim 1,
wherein the plurality of determination processes includes as one of the different methods an indication monitoring process of monitoring whether or not the message has an indication of an anomaly to determine whether or not the message is anomalous.

5. The log generation method according to claim 1, wherein
the first determination process is a status detecting process of detecting status of a vehicle in accordance with the message to determine whether or not the message is anomalous, and
the second determination process is an indication monitoring process of monitoring whether or not the message has an indication of anomaly to determine whether or not the message is anomalous.

6. A log generation device that generates a log of communication on an in-vehicle network, the log generation device comprising:
at least one processor; and
a memory including at least one set of instructions that, when executed by the at least one processor, causes the at least one processor to perform operations including:
performing a plurality of determination processes for determining, by using different methods, whether or not a message sent to the in-vehicle network is anomalous;
generating a log in accordance with results of the plurality of determination processes; and
transmitting the generated log,
wherein the generating includes determining at least one information item to be included in the log in accordance with a combination of the results of the plurality of determination processes,
the plurality of determination processes includes a first determination process for determining that the message is anomalous and a second determination process for determining that the message is anomalous, the first determination process and the second determination process being performed independently from each other, and
in the generating,
in a case where the first determination process and the second determination process both determine independently that the message is anomalous,
(A) when a reason for which the first determination process determines that the message is anomalous is different from a reason for which the second determination process determines that the message is anomalous, the at least one information item is:
a first type identifier indicating that the first determination process determines that the message is anomalous;
first information item indicating the reason for which the first determination process determines that the message is anomalous;
a second type identifier indicating that the second determination process determines that the message is anomalous; and
second information item indicating the reason for which the second determination process determines that the message is anomalous, and
(B) when the reason for which the first determination process determines that the message is anomalous is same as the reason for which the second determination process determines that the message is anomalous, the at least one information item is:
the first type identifier;
the second type identifier; and
one of the first information item and the second information item.

7. A non-transitory computer-readable recording medium embodied with a computer program, the computer program causing a computer to execute a log generation method for generating a log of communication on an in-vehicle network, the log generation method comprising:
performing a plurality of determination processes for determining, by using different methods, whether or not a message sent to the in-vehicle network is anomalous;
generating a log in accordance with results of the plurality of determination processes; and
transmitting the generated log,
wherein the generating includes determining at least one information item to be included in the log in accordance with a combination of the results of the plurality of determination processes,
the plurality of determination processes includes a first determination process for determining that the message is anomalous and a second determination process for determining that the message is anomalous, the first determination process and the second determination process being performed independently from each other, and
in the generating,
in a case where the first determination process and the second determination process both determine independently that the message is anomalous,
(A) when a reason for which the first determination process determines that the message is anomalous is different from a reason for which the second determination process determines that the message is anomalous, the at least one information item is:
a first type identifier indicating that the first determination process determines that the message is anomalous;
first information item indicating the reason for which the first determination process determines that the message is anomalous;
a second type identifier indicating that the second determination process determines that the message is anomalous; and
second information item indicating the reason for which the second determination process determines that the message is anomalous, and
(B) when the reason for which the first determination process determines that the message is anomalous is same as the reason for which the second determination process determines that the message is anomalous, the at least one information item is:
the first type identifier;
the second type identifier; and
one of the first information item and the second information item.

* * * * *